US009548886B2

(12) United States Patent
Gates et al.

(10) Patent No.: US 9,548,886 B2
(45) Date of Patent: Jan. 17, 2017

(54) HELP DESK TICKET TRACKING INTEGRATION WITH ROOT CAUSE ANALYSIS

(71) Applicant: CA, INC., Islandia, NY (US)

(72) Inventors: Carrie E. Gates, New York, NY (US); Steven L. Greenspan, Dallas, TX (US); Maria C. Velez-Rojas, San Jose, CA (US); Serguei Mankovskii, San Ramon, CA (US)

(73) Assignee: CA, INC., New York, NY (US)

( * ) Notice: Subject to any disclaimer, the term of this patent is extended or adjusted under 35 U.S.C. 154(b) by 269 days.

(21) Appl. No.: 14/242,866

(22) Filed: Apr. 2, 2014

(65) Prior Publication Data
US 2015/0288557 A1    Oct. 8, 2015

(51) Int. Cl.
*G06F 11/00* (2006.01)
*H04L 12/24* (2006.01)
*G06F 11/07* (2006.01)
*G06F 11/30* (2006.01)

(52) U.S. Cl.
CPC ......... *H04L 41/0636* (2013.01); *G06F 11/079* (2013.01); *G06F 11/0709* (2013.01); *G06F 11/30* (2013.01); *H04L 41/5074* (2013.01)

(58) Field of Classification Search
CPC .. H04L 41/0636; H04L 41/5074; G06F 11/30; G06F 11/0709; G06F 11/079
USPC .......................................................... 714/37
See application file for complete search history.

(56) References Cited

U.S. PATENT DOCUMENTS

| 7,542,998 | B1 | 6/2009 | Lavie |
| 8,296,104 | B2 | 10/2012 | Ramacher |
| 8,302,079 | B2 | 10/2012 | Bansal |
| 8,327,335 | B2 | 12/2012 | Noble |
| 8,612,377 | B2 | 12/2013 | Beg |
| 2005/0099419 | A1* | 5/2005 | Castonguay ........ H04L 41/0659 345/420 |
| 2008/0181099 | A1* | 7/2008 | Torab .................. H04L 41/5074 370/216 |
| 2009/0052448 | A1* | 2/2009 | Ramakrishnan .... H04L 12/1886 370/390 |
| 2009/0058857 | A1* | 3/2009 | Ballantyne ............ G06T 11/206 345/440 |

(Continued)

*Primary Examiner* — Yair Leibovich
(74) *Attorney, Agent, or Firm* — Vierra Magen Marcus LLP

(57) ABSTRACT

Methods for automatically generating help desk tickets in response to detecting performance and/or availability issues that occur throughout multiple layers of a networked computing environment are described. In some embodiments, in response to detecting an alert corresponding with a performance issue affecting the networked computing environment, a root cause identification tool may aggregate a plurality of alarms from a plurality of performance management tools monitoring the networked computing environment, generate a failure graph associated with the performance issue, identify a first leaf node of the failure graph, determine a first remedy associated with the first leaf node, and automatically generate a help desk ticket corresponding with the first leaf node and the first remedy. The automatically generated help desk ticket may specify the failure associated with the first leaf node, the first remedy, a location associated with the first remedy, and an estimated time to fix the failure.

20 Claims, 14 Drawing Sheets

(56) References Cited

U.S. PATENT DOCUMENTS

| | | | |
|---|---|---|---|
| 2012/0005534 A1* | 1/2012 | Li | G06F 11/008 |
| | | | 714/26 |
| 2013/0019008 A1* | 1/2013 | Jorgenson | H04L 41/12 |
| | | | 709/224 |
| 2014/0193154 A1* | 7/2014 | Graham | H04L 67/28 |
| | | | 398/79 |

* cited by examiner

450

550

HELP DESK TICKET TRACKING INTEGRATION WITH ROOT CAUSE ANALYSIS

BACKGROUND

This disclosure relates to systems and methods for monitoring a networked computing environment and for identifying and reporting root causes of performance and availability issues that occur throughout multiple layers of the networked computing environment.

Information technology management software may refer to software tools for monitoring the performance and availability of resources and services across a networked computing environment, such as a data center environment or a cloud computing environment. The multiple layers of a networked computing environment may be monitored and managed using various software tools, such as application performance management tools, network performance management tools, and system performance management tools. Application performance management tools may monitor and manage the performance and availability of software applications. For example, an application performance management tool may monitor the volume of transactions processed by a particular application over time (e.g., the number of transactions per second), the response times of the particular application over various load conditions (e.g., average response times under a peak load), and the computing and storage resources consumed by the particular application over time (e.g., the memory footprint). Network performance management tools may monitor the performance of network resources and components, such as network routers and switches. For example, a network performance management tool may identify devices located on a network, monitor response times and availability of devices connected to the network, and track bandwidth utilization and latency across the various components of the network. System performance management tools may monitor the performance of computing devices and/or storage devices. For example, a system performance management tool may monitor CPU, memory, or disk usage over time.

BRIEF SUMMARY

According to one aspect of the present disclosure, methods for automatically generating help desk tickets in response to detecting performance and availability issues that occur throughout multiple layers of a networked computing environment are disclosed.

In some embodiments, in response to detecting an alert corresponding with a performance issue affecting the networked computing environment, a root cause identification tool may aggregate a plurality of alarms from a plurality of performance management tools monitoring the networked computing environment, generate a failure graph associated with the performance issue, identify a first leaf node of the failure graph, determine a first remedy associated with the first leaf node, and automatically generate a help desk ticket corresponding with the first leaf node and the first remedy. The automatically generated help desk ticket may specify the failure associated with the first leaf node, the first remedy, a location associated with the first remedy, and an estimated time to fix the failure.

In some embodiments, issue tickets entered into a help desk ticket database may be treated as human generated alarms. For example, a help desk ticket may be created specifying that a particular application is not available. The description provided in the help desk ticket may be parsed for key words and/or the submission of the help desk ticket may require that particular pull-down fields are specified (e.g., regarding the availability of a particular application or the ability to access a particular storage device). The root cause identification tool may then aggregate not only a plurality of alarms from a plurality of performance management tools monitoring the networked computing environment, but also a second set of alarms corresponding with the issue tickets entered into the help desk ticket database. The root cause identification tool may then aggregate the plurality of alarms and the second set of alarms and generate a failure graph associated with the performance issue based on the plurality of alarms and the second set of alarms.

In some embodiments, the networked computing environment may comprise an IT infrastructure that provides data processing and/or data storage services. For example, the networked computing environment may comprise a portion of a data center that provides software services to end users accessing the networked computing environment. The networked computing environment may include resources (e.g., servers and storage units) and the services provided by the networked computing environment (e.g., web-based work productivity applications or business tools for managing a corporation's financial information). The networked computing environment may include servers, data storage units, power distribution units, power delivery systems, cooling systems, virtualization layers, and the networking fabric connecting the servers and data storage units to each other and to external sources (e.g., an edge server connected to an ISP). The different components of the networked computing environment, including the power delivery systems, cooling systems, storage units, servers, applications, network connections, and services may be monitored from different points of view using a plurality of information technology management software tools that report performance and availability metrics associated with the different components being monitored over time. In some embodiments, a root cause identification tool may aggregate data from a plurality of information technology management software tools monitoring different layers of a networked computing environment, identify causal relationships associated with a performance issue based on the aggregated data, determine a root cause of the performance issue based on the causal relationships, and report the root cause of the performance issue and possible remedies to the performance issue to an end user of the root cause identification tool based on a role of the end user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
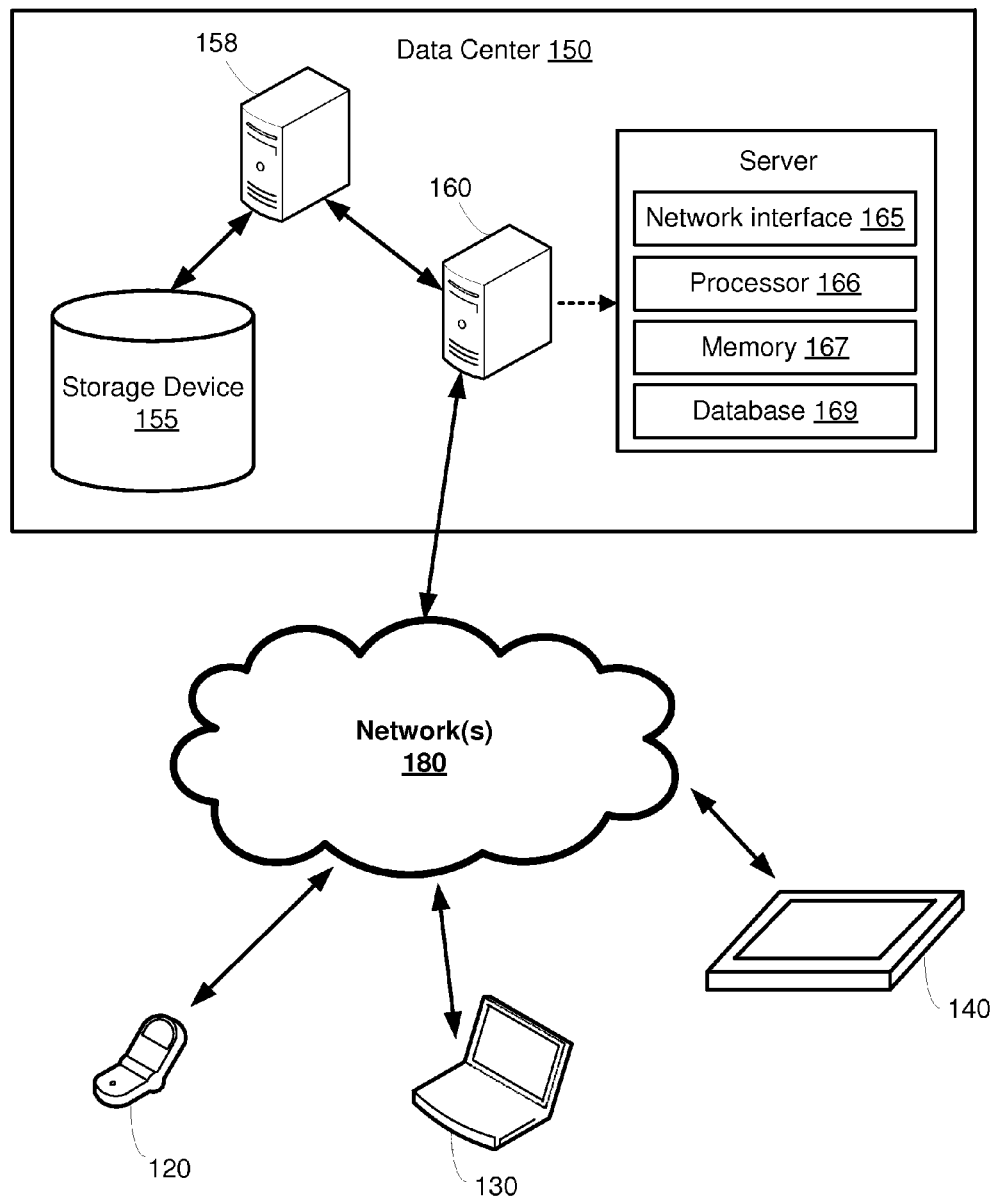
FIG. 1 depicts one embodiment of a networked computing environment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET or the like, conventional procedural programming languages, such as the "C" programming language, Visual Basic, Fortran 2003, Perl, Python, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Technology is described for monitoring a networked computing environment and for identifying root causes of performance and/or availability issues that occur throughout multiple layers of the networked computing environment. The networked computing environment may include resources within a data center (e.g., servers and storage units) and the services provided by the data center (e.g., web-based work productivity applications or business tools for managing a corporation's financial information). The networked computing environment may include servers, data storage units, power distribution units, power delivery systems, cooling systems, virtualization layers, and the networking fabric connecting the servers and data storage units to each other and to external sources (e.g., an edge server connected to an ISP). In one example, the networked computing environment may comprise hundreds of data storage units in communication with thousands of servers running hundreds of thousands of applications providing hundreds of software services. The storage units, servers, applications, and services may be monitored from different points of view using a plurality of information technology management software tools that report performance and availability metrics associated with the resources and applications being monitored over time. The networked computing environment may also comprise electrical systems for powering the servers and data storage units, and cooling systems for regulating the ambient temperature near the servers and/or data storage units. In some embodiments, a root cause identification tool may aggregate data from a plurality of information technology management software tools, identify causal relationships associated a performance issue based on the aggregated data, determine a root cause of the performance issue based on the causal relationships, and report the root cause and possible remedies to the performance issue to an end user of the root cause identification tool based on a role of the end user (e.g., whether the end user is a system administrator, a manager, or a chief information officer).

In one embodiment, a causal relationship between two events (e.g., two failures occurring within a networked computing environment) may comprise a relationship between a first event and a second event, wherein the second event is a consequence of the first event. The second event may comprise a direct or indirect consequence of the first event. In another embodiment, a causal relationship between two events may comprise a relationship between a first event and a second event, wherein if the first event occurs, then the second event must also occur. However, if the second event occurs, it does not necessarily mean that the first event has also occurred. As an example, if electrical power to a server running an application is disconnected from the server (i.e., a first event), then the application running on the server will be terminated (i.e., if the first event occurs, then the second event of the application being terminated will also occur). However, if an application running on a server terminates unexpectedly, then the termination may be due to other causes besides the electrical power being disconnected from the server.

In some cases, a root cause identification tool may aggregate data from a plurality of information technology management software tools that monitor different layers of an IT infrastructure in order to identify a root cause for a performance or availability issue affecting the IT infrastructure. In one example, a service (or software service) provided by an IT infrastructure (e.g., an online social networking service requiring access to a database application and a messaging application to provide the social networking service) may require the availability of a plurality of applications. The plurality of applications may run on a plurality of servers located in different locations around the world. In one example, a first set of the plurality of servers may be located in a first country and a second set of the plurality of servers may be located in a second country. The first set of servers may be located within a room (or within multiple rooms spanning multiple buildings) and mounted on a plurality of racks (e.g., the room may include five server racks, with each of the five server racks holding 20 servers). The first set of servers may be interconnected via a first network, the second set of servers may be interconnected via a second network, and the first network may be connected to the second network via a third network (e.g., the Internet or an extranet).

The root cause identification software tool (or application) may identify a root cause of a performance or availability issue affecting the IT infrastructure upon receiving an alert message from a service-level management application of the plurality of information technology management software tools monitoring the IT infrastructure. In one example, in the event that a cooling system (e.g., a fan or an air conditioning unit) for regulating the temperature of a room (or a portion of the room) storing the first set of servers malfunctions, then the ambient temperature of the room may rise causing the first set of servers to overheat, which in turn causes the first set of servers to shutdown, which in turn causes the applications running on the first set of servers to be terminated, which in turn may lead to a performance issue for the service (e.g., a slow down for operations performed via the online social networking service) or an availability issue for the service (e.g., users may not be able to use or access the online social networking service). In this case, the plurality of information technology management software tools may overwhelm system administrators with numerous alarms regarding the unexpected termination of service-critical applications and the unexpected shutdown of numerous servers within the room.

In order to quickly diagnosis the root cause of the problems and to provide a quick resolution to the performance and availability issues, the root cause identification software tool may aggregate data from the plurality of information technology management software tools (e.g., acquiring updated information every minute), identify a service-related performance or availability issue, identify causal relationships associated the service-related performance or availability issue based on the aggregated data, determine a root cause of the service-related performance or availability issue based on the causal relationships, and report the root cause and possible remedies to the service-related performance or availability issue to an end user of the root cause identification tool based on a role of the end user. The end user may receive a single message or an alarm regarding the cooling system within the room being the root cause of the performance or availability issue. The root cause identification software tool may also suppress all warnings or alarms generated from the plurality of information technology management software tools that are a consequence of the root cause (e.g., that are a consequence of the cooling system malfunction). Thus, one benefit of automatically identifying the root cause of the performance or availability issue may be a quicker resolution of the issue and reduced downtime for the service.

FIG. 1 depicts one embodiment of a networked computing environment 100 in which the disclosed technology may be practiced. Networked computing environment 100 includes a plurality of computing devices interconnected through one or more networks 180. The one or more networks 180 allow computing devices and/or storage devices to connect to and communicate with other computing devices and/or other storage devices. As depicted, a mobile device 120, a mobile device 130, a mobile device 140, and a data center 150 are in communication with each other via one or more networks 180. The data center 150 includes a server 160 (e.g., an edge server) in communication with a server 158 (e.g., an application server) that is in communication with a storage device 155 (e.g., a network-attached storage device). In some cases, the storage device 155 may comprise a hard disk drive, a magnetic tape drive, or a solid-state drive. In some embodiments, the networked computing environment may include other computing and/or storage devices not shown. For example, a data center may include thousands of servers and/or data storage devices in communication with each other. The data storage devices may comprise a tiered data storage infrastructure (or a portion of a tiered data storage infrastructure). In some cases, a tiered data storage infrastructure may include redundant arrays of independent disks and/or storage area networks.

The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection. The one or more networks 180 may include an extranet or other private network for securely sharing information or providing controlled access to applications.

A server, such as server 160, may allow a client to download information (e.g., text, audio, image, and video files) from the server or to perform a search query related to particular information stored on the server. In some cases, server 160 may act as a mail server or a file server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 160 includes a network interface 165, processor 166, and memory 167, all in communication with each other. Network interface 165 allows server 160 to connect to one or more networks 180. Network interface 165 may include a wireless network interface, a modem, and/or a wired network interface. Processor 166 allows server 160 to execute computer readable instructions stored in memory 167 in order to perform processes discussed herein. In some cases, the server 160 may establish a secure connection with one or more computing devices (e.g., using a virtual private network connection). Processor 166 may comprise one or more processing elements (e.g., multiple CPUs). In one embodiment, server 160 may store data in a database 169 or acquire data to be processed from the database 169. The stored data associated with database 169 may reside in memory 167.

The networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents. The networked computing environment may comprise a cloud computing environment providing Software-as-a-Service (SaaS) or Infrastructure-as-a-Service (Iaas) services. Saas may refer to a software distribution model in which applications are hosted by a service provider and made available to end users over the Internet. The networked computing environment 100 may provide a software service that requires the availability of one or more applications to be operational.

The networked computing environment 100 may comprise an IT infrastructure for providing one or more services. In some embodiments, a root cause identification tool (or software application) may run on a server, such as server 158, while various services are provided by the networked computing environment 100. The root cause identification tool may aggregate data from a plurality of information technology management software tools that monitor different layers of the IT infrastructure in order to identify a root cause for a performance or availability issue affecting the IT infrastructure. In one example, a service (or software service) provided by the IT infrastructure (e.g., an online social networking service requiring access to a database application and a messaging application to provide the social networking service) may require the availability of a plurality of applications. The root cause identification tool may detect a performance or availability issue affecting one of the plurality of applications, identify causal relationships associated with the performance or availability issue based on the aggregated data, determine a root cause of the performance or availability issue based on the causal relationships, and report the root cause and possible remedies to the performance or availability issue to an end user of the root cause identification tool based on a role of the end user.

Figure 2:
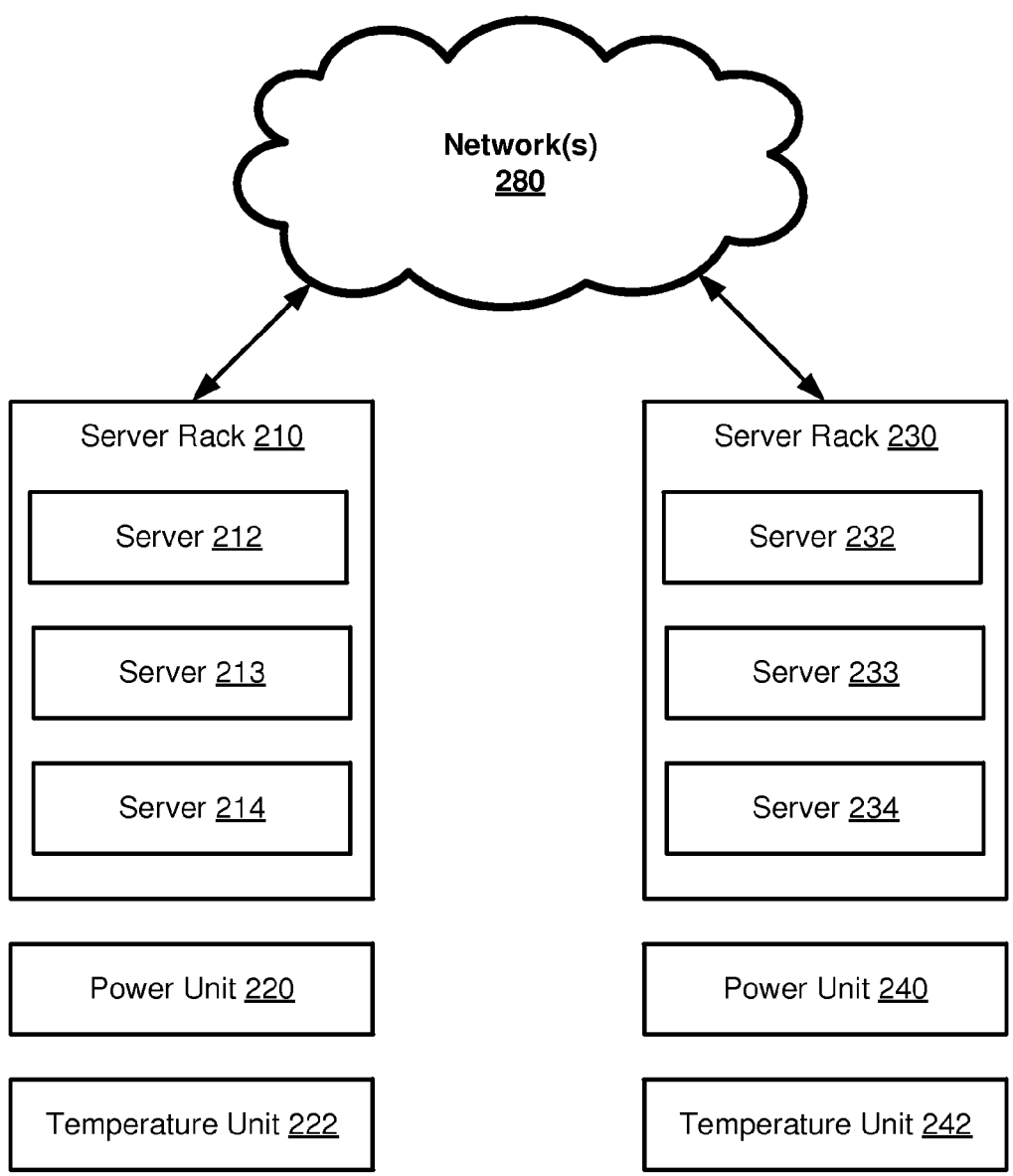
FIG. 2 depicts one embodiment of a portion of a data center.

FIG. 2 depicts one embodiment of a portion of a data center, such as a portion of data center 150 in FIG. 1. The portion of a data center 250 includes a server rack 210 holding servers 212-214, a power unit 220 for powering the servers 212-214, and a temperature unit 222 for monitoring and regulating an ambient temperature surrounding the servers 212-214. The server rack 210 may be placed within a first part of a room storing the data center. The portion of a data center 250 includes a server rack 230 holding servers 232-234, a power unit 240 for powering the servers 232-234, and a temperature unit 242 for monitoring and regulating an ambient temperature surrounding the servers 232-234. The server rack 230 may be placed within a second part of a room storing the data center. The temperature units may acquire temperature information from temperature sensors located outside a server rack, located inside a server rack, inside a server, or inside components inside the server. For example, a temperature unit may monitor temperatures associated with a room, a server rack, a server box housing a server, or components of the server (e.g., a semiconductor chip or a processing core used by the server).

In one embodiment, a root cause identification tool may acquire location information (e.g., GPS information or a location relative to a map of a room) associated with server racks, servers, power units, and temperature units in order to identify root cause failures that are common to different computing devices or other components located within a data center. For example, the server rack 210 may be associated with a first physical location within a room and the server rack 230 may be associated with a second physical location within the room. A root cause identification tool may continuously monitor services and/or applications provided by the servers within the data center. In response to detecting that an application has unexpectedly failed or has a performance issue (e.g., response times for the application are greater than a threshold), the root cause identification tool may aggregate data from a plurality of monitoring applications that monitor different layers of the data center infrastructure. The root cause identification tool may then determine that multiple applications have failed corresponding with servers within a particular server rack, such as server rack 210, based on the location information associated with the particular server rack. The root cause identification tool may determine that a power unit for providing power to the particular server rack has failed and is therefore a root cause for the failure of the multiple applications. In some cases, if the power unit 220 is also used to power the temperature unit 222, then a failure of the power unit 220 may also cause a failure of the temperature unit 222 and be the root cause for alarms associated with the failure of the temperature unit 222. In another example, the root cause identification tool may determine that a temperature unit for regulating the temperature of the particular server rack has failed and is therefore a root cause for the failure of the multiple applications.

Figure 3:
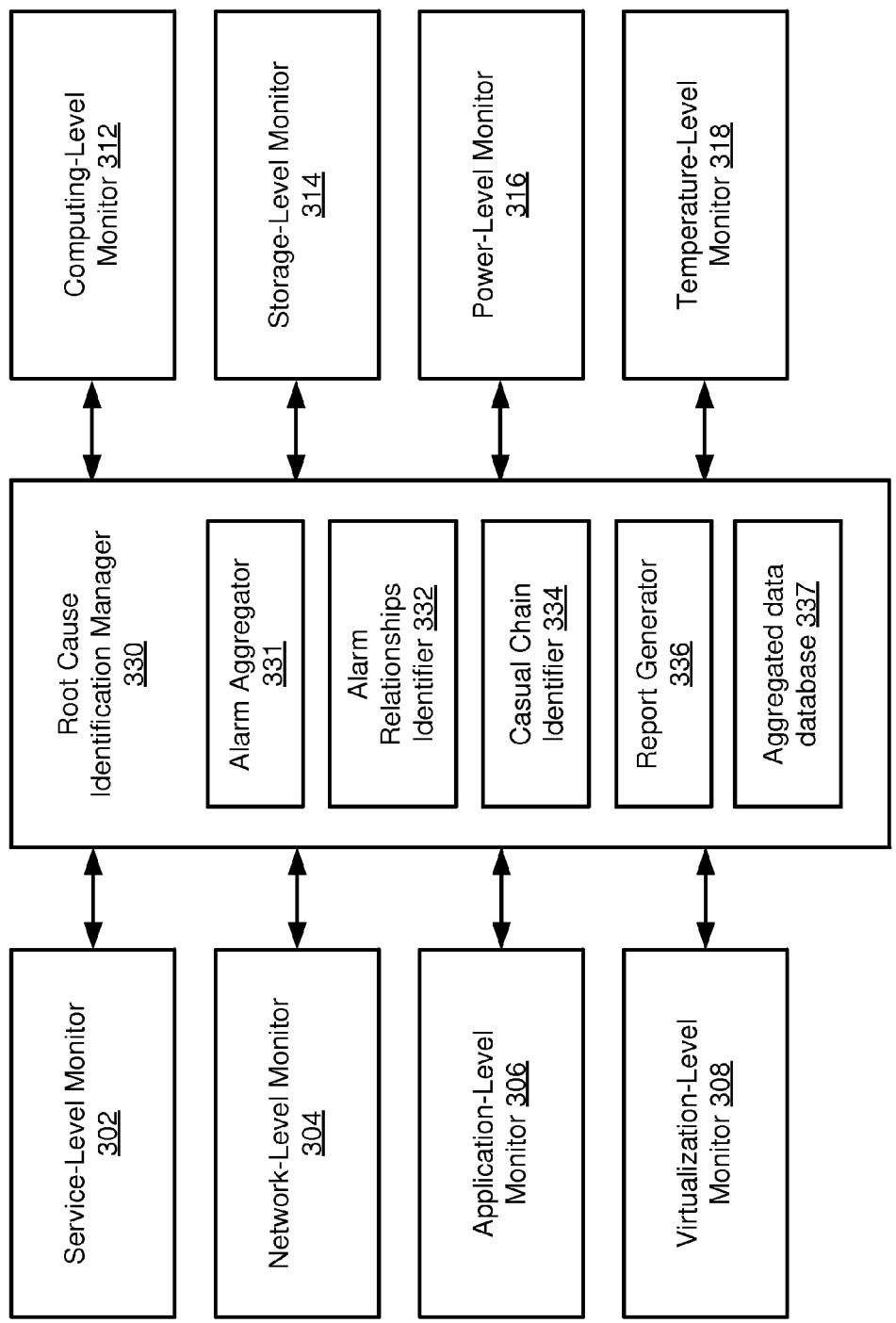
FIG. 3 depicts one embodiment of a monitoring system including a root cause identification manager for identifying a root cause of a performance or availability issue affecting a networked computing environment.

FIG. 3 depicts one embodiment of a monitoring system 350 including a root cause identification manager 330 for identifying a root cause of a performance or availability issue affecting a networked computing environment. The monitoring system 350 includes a plurality of monitoring applications for monitoring different layers of the networked computing environment. The plurality of monitoring applications includes a service-level monitor 302, a network-level monitor 304, an application-level monitor 306, a virtualization-level monitor 308, a computing-level monitor 312, a storage-level monitor 314, a power-level monitor 316, and a temperature-level monitor 318. The root cause identification manager 330 is in communication with each of the plurality of monitoring applications and may aggregate data (e.g., alarms generated by the monitoring applications, as well as log files generated by devices monitored by the monitoring applications) and store the aggregated data in a database, such as aggregated data database 337.

The service-level monitor 302 may monitor the performance and availability of services provided by the networked computing environment. In one embodiment, the service-level monitor 302 may monitor response times experienced by various end users of a service. The network-level monitor 304 may monitor the performance of networks associated with the networked computing environment. In one embodiment, the network-level monitor 304 may monitor the performance of a network connecting an end user device (e.g., a mobile device or workstation) with an application server. The network-level monitor 304 may monitor response times and availability of devices connected to the network, as well as track bandwidth utilization and latency across the various components of the network. The application-level monitor 306 may monitor the performance of applications provided by the networked computing environment. In one embodiment, the application-level monitor 306 may monitor a status history associated with a particular application (e.g., whether the particular application is running, halted, or non-responsive), the volume of transactions processed by the particular application over time, the response times of the particular application over various load conditions (e.g., average response times under a peak load), and the computing and storage resources consumed by the particular application over time (e.g., the memory footprint). The virtualization-level monitor 308 may monitor the performance of a virtual machine running a particular application.

The computing-level monitor 312 may monitor the performance of a computing device running a particular application. In one embodiment, the computing-level monitor 312 may monitor CPU performance, CPU core performance, and physical memory usage for the computing device. The storage-level monitor 314 may monitor the performance of a storage device connected to a network. In one embodiment, the storage-level monitor 314 may monitor disk usage and disk access times for the storage device over time. The power-level monitor 316 may monitor whether power is connected to a particular device (e.g., electrical power is connected to a particular computing device or a particular storage device). The power-level monitor 316 may also monitor whether power is connected to specific servers, storage devices, switches, and other data center components. The temperature-level monitor 318 may monitor temperatures associated with a room, a server rack, physical servers, and storage devices. The temperature-level monitor 318 may also generate and transmit alarms if a particular temperature is not within a desired range or if a temperature regulator is not able to regulate a temperature associated with a hardware component of the networked computing environment to be within the desired range. In one example, the temperature-level monitor 318 may generate an alarm if a temperature within a data center room is not between 10 degrees Celsius and 30 degrees Celsius. In another example, the temperature-level monitor 318 may generate an alarm if a processor core associated with a particular server has a chip temperature that is greater than 105 degrees Celsius.

The root cause identification manager 330 includes an alarm aggregator 331, an alarm relationships identifier 332, a causal chain identifier 334, a report generator 336, and an aggregated data database 337. The root cause identification manager 330 may comprise an application running on a server, such as server 158 in FIG. 1. The alarm aggregator 331 acquires data from the plurality of monitoring applications and aggregates the data. The aggregated data may include alarms or alerts generated by the plurality of monitoring applications, as well as log files generated by devices being monitored by the plurality of monitoring applications. The alarm aggregator 331 may aggregate data upon detection of a particular event (e.g., upon detection of a service-level failure) or may aggregate data periodically (e.g., every 5 minutes) and store the aggregated data in the aggregated data database 337. The alarm relationships identifier 332 may map a plurality of alarms generated by the plurality of monitoring applications to nodes in a failure graph. Each alarm of the plurality of alarms may be associated with a description of the underlying failure detected and a timestamp for when the underlying failure occurred.

In one embodiment, each node in a failure graph may correspond with an individual alarm of the plurality of alarms or a collection of alarms of the plurality of alarms. In another embodiment, each node in a failure graph may correspond with a particular type of alarm at a particular level in a networked computing environment hierarchy (e.g., CPU utilization alarms associated with a particular server or application performance alarms associated with a particular application). In some cases, a failure graph may be generated for each alarm of the plurality of alarms generated by the service-level monitor 302.

The alarm relationships identifier 332 may generate directed edges within a failure graph corresponding with a causal relationship between pairs of nodes in the failure graph. A directed edge in the failure graph may represent that a first failure is a direct consequence of another failure. For example, the first failure may correspond with a first node in the failure graph with a directed edge to a second node in the failure graph corresponding with a second failure that is a direct consequence of the first failure. In this case, the directed edge represents a causal relationship between the first failure and the second failure. In one embodiment, the failure graph may comprise a directed acyclic graph. In another embodiment, the failure graph may comprise a Bayesian network with causal relationship probabilities assigned to each of the directed edges. The causal relationship probabilities may be stored in tables linked to the edges of the failure graph. In this case, the structure of the failure graph and the assigned probabilities may be learned from the aggregated data. In one example, the graph structure of the Bayesian network may be determined using machine learning techniques based on the aggregated data and changes in the aggregated data over time (e.g., the aggregated data stored in the aggregated data database 337 may be used as training data for learning the causal relationships between the nodes over time).

The causal chain identifier 334 may identify a chain of failures beginning from a first node in the failure graph (e.g., a leaf node) and ending at a root node of the failure graph. The root node of the failure graph may correspond with the highest-level alarm generated by the plurality of monitoring applications. The leaf nodes of the failure graph may correspond with root causes of the highest-level alarm. The leaf nodes may comprise nodes without any predecessor nodes or nodes without any incoming directed edges from another node in the failure graph. A chain of failures may comprise a set of nodes along a path from a leaf node in the failure graph to the root node of the failure graph.

In one embodiment, the causal chain identifier 334 may identify a particular chain of failures within the failure graph based on an estimated time to fix a failure associated with the leaf node of the particular chain of failures. In another embodiment, the causal chain identifier 334 may identify a particular chain of failures within the failure graph based on a length of the particular chain of failures. For example, the particular chain of failures may comprise the shortest chain of failures in the failure graph. In another embodiment, the causal chain identifier 334 may identify a particular chain of failures based on a number of alarms that are a consequence of the leaf node of the particular chain of failures. For example, the particular chain of failures may include a leaf node in which fixing the failure associated with the leaf node will fix the greatest number of unresolved alarms.

The report generator 336 may generate and transmit a report to a target recipient of the report based on an identified chain of failures. In one embodiment, the report generator 336 may identify a role associated with a target recipient and output a report to the target recipient based on the role and an ontology defined for the role. The role of the target recipient may be determined based on a user name, an employee identification number, or an email address associated with the target recipient. In one example, a person with a technical role within an organization may receive a report with technical information (e.g., server utilization information), while a person with a non-technical role within the organization may receive a report with business-focused information (e.g., the number of people who can currently connect to a particular application or the estimated downtime for the particular application).

In some embodiments, an application-level monitoring application, such as application-level monitor 306, may generate a first alarm based on an error coming from an application server (e.g., that a database application is not responsive or that the application server cannot connect to the database). In response to the first alarm, the root cause identification manager 330 may identify causally related alarms generated from other monitoring applications (e.g., the network-level monitor 304 and other monitoring applications monitoring a networked computing environment). In one example, close to the time at which the first alarm from the application-level monitoring application was generated, the root cause identification manager 330 may identify a second alarm generated from the network-level monitor 304 related to a particular network switch malfunctioning and determine whether the first alarm is a direct consequence of the second alarm (i.e., that the failure of the particular network switch would cause the error coming from the application server). In some cases, the failure of the particular network switch may be caused by a hardware-related issue (e.g., due to a power failure or a physical connection issue) or software-related issue (e.g., the particular network switch was overloaded with too many connections). If the first alarm is determined to be a direct consequence of the second alarm, then the root cause identification manager 330 may attempt to identify a third alarm that is the cause of the second alarm. If a third alarm is not identified, then the second alarm may be outputted as the root cause of the error coming from the application server.

In some embodiments, a root cause identification tool, such as root cause identification manager 330, may aggregate data from a plurality of information technology management software tools periodically or in response to a service-level performance issue being detected (e.g., a service is no longer available to an end user of the service). The aggregated data may include service-level data related to a service provided by a networked computing environment, such as the availability of the service and response times associated with the service. The service may require a plurality of applications to be available (e.g., an online personal information manager may require a word processing application, an email application, and a database application to be available). The aggregated data may include application-level data related to the plurality of applications, such as a status of each of the plurality of applications (e.g., currently running, halted, or terminated) and an identification of a first set of servers which are running the plurality of applications. The aggregated data may include networking-level data associated with networks connected to the first set of servers, such as the resources available in the network and network utilization metrics. The aggregated data may include virtualization-level data associated with the performance of virtual machines on which applications are running. The aggregated data may include device-level data associated with device level performance metrics (e.g., computing device utilization or storage device utilization). From the aggregated data corresponding with the different perspectives offered by the plurality of information technology management software tools, the root cause identification tool may determine causal relationships between failures occurring at different layers within a failure hierarchy (e.g., represented as directed edges between failure nodes in a directed acyclic graph) and identify a root cause of a service-level performance issue based on the causal relationships. In one example, a root cause of a service-related performance issue may comprise a disk failure or a power failure to a data storage unit storing a database critical to a service.

Figure 4:
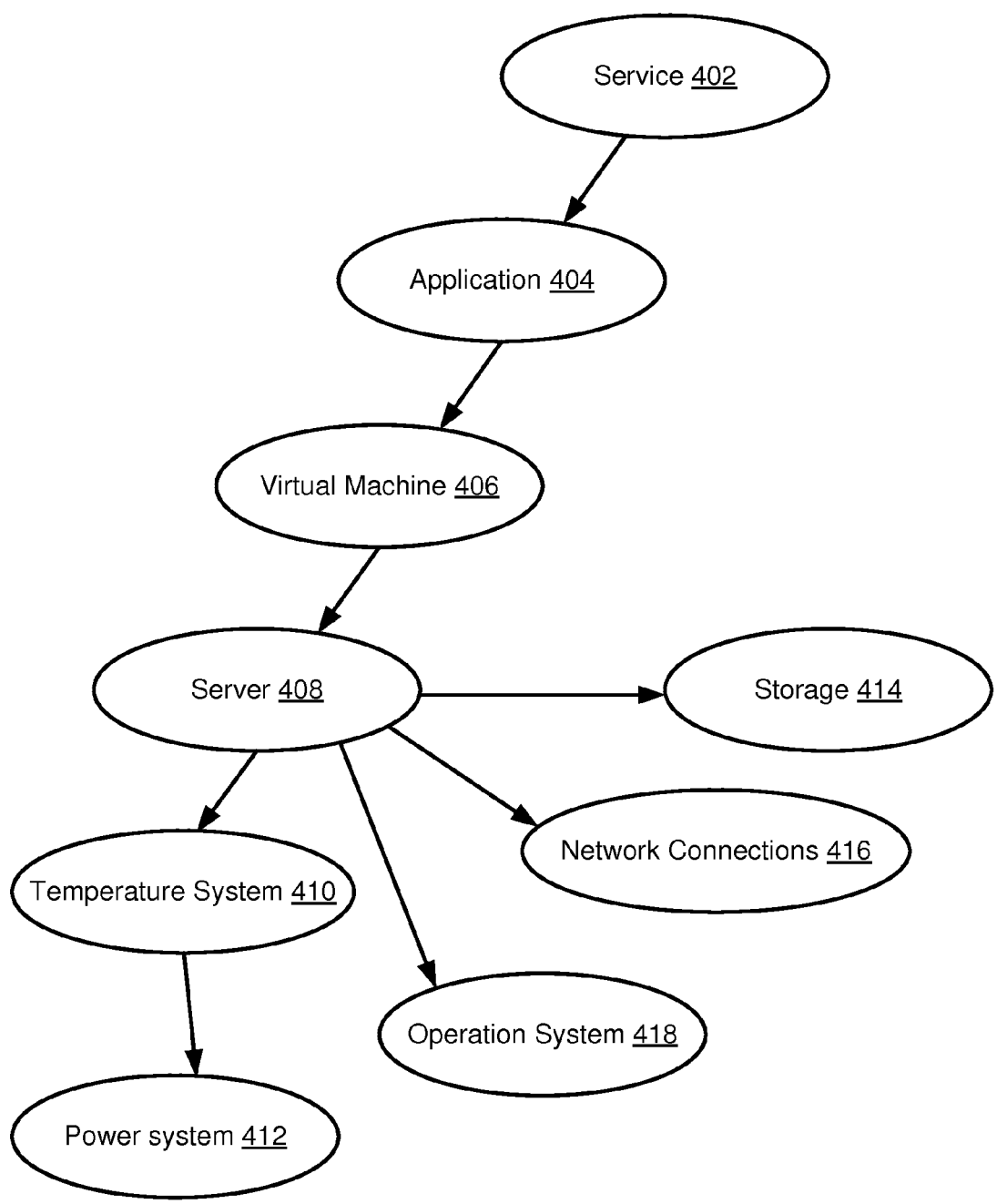
FIG. 4 depicts one embodiment of an infrastructure mapping for mapping services or applications to components of a networked computing environment that support the services or applications at a particular time.

FIG. 4 depicts one embodiment of an infrastructure mapping 450 for mapping services or applications to components of a networked computing environment that support the services or applications at a particular time. The particular time may correspond with a time of failure or a time prior to the time of failure. The infrastructure mapping may comprise a directed graph in which an application is mapped to hardware and software components of the networked computing environment that support the execution of the application. As depicted, service 402 may require one or more applications to be available including application 404 at a particular time. The application 404 may be running on a virtual machine 406 at the particular time. The virtual machine 406 may be running on a server 408 at the particular time. The server 408 may rely on operating system 418 to run the application 404. To run the application 404, the server 408 may require network connections 416 and access to storage 414 at the particular time. To run the application 404, server 408 may require a particular temperature to be regulated using temperature system 410. The particular temperature may correspond with a die temperature, a server temperature, a server rack temperature, or an ambient room temperature. The temperature system 410 may require a power connection via a power system 412 to be operational.

In one embodiment, an infrastructure mapping may be used by a root cause identification tool, such as root cause identification manager 330 in FIG. 3, to determine which server an application was running on when the application failed. The identification of the server may be used for identifying alarms that may have a relationship to the failure of the application. If the root cause identification tool determines that the server had a failure, then the infrastructure mapping may be used to identify a power system responsible for powering a cooling system associated with the server or for powering the server itself.

Figure 5A:
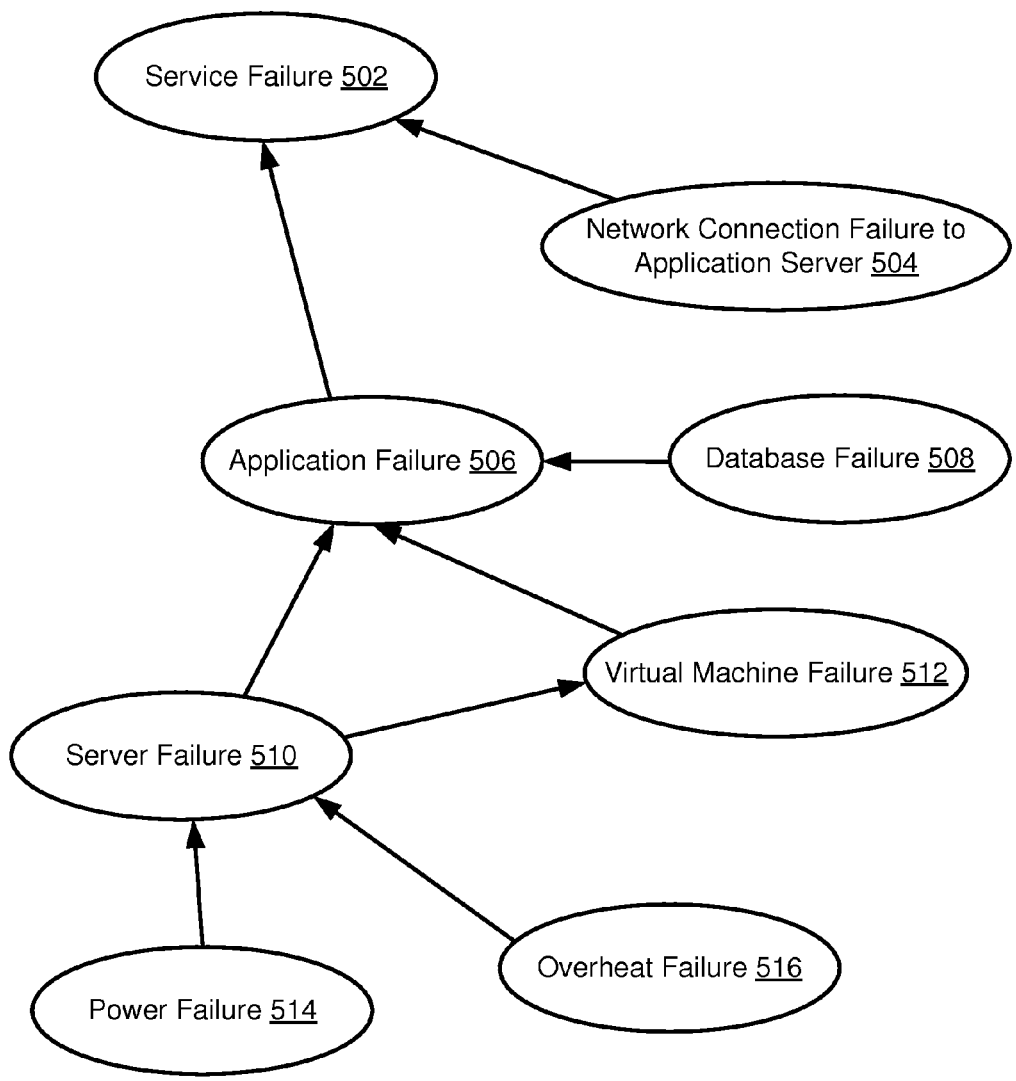
FIG. 5A depicts one embodiment of a failure graph template.
Figure 5B:
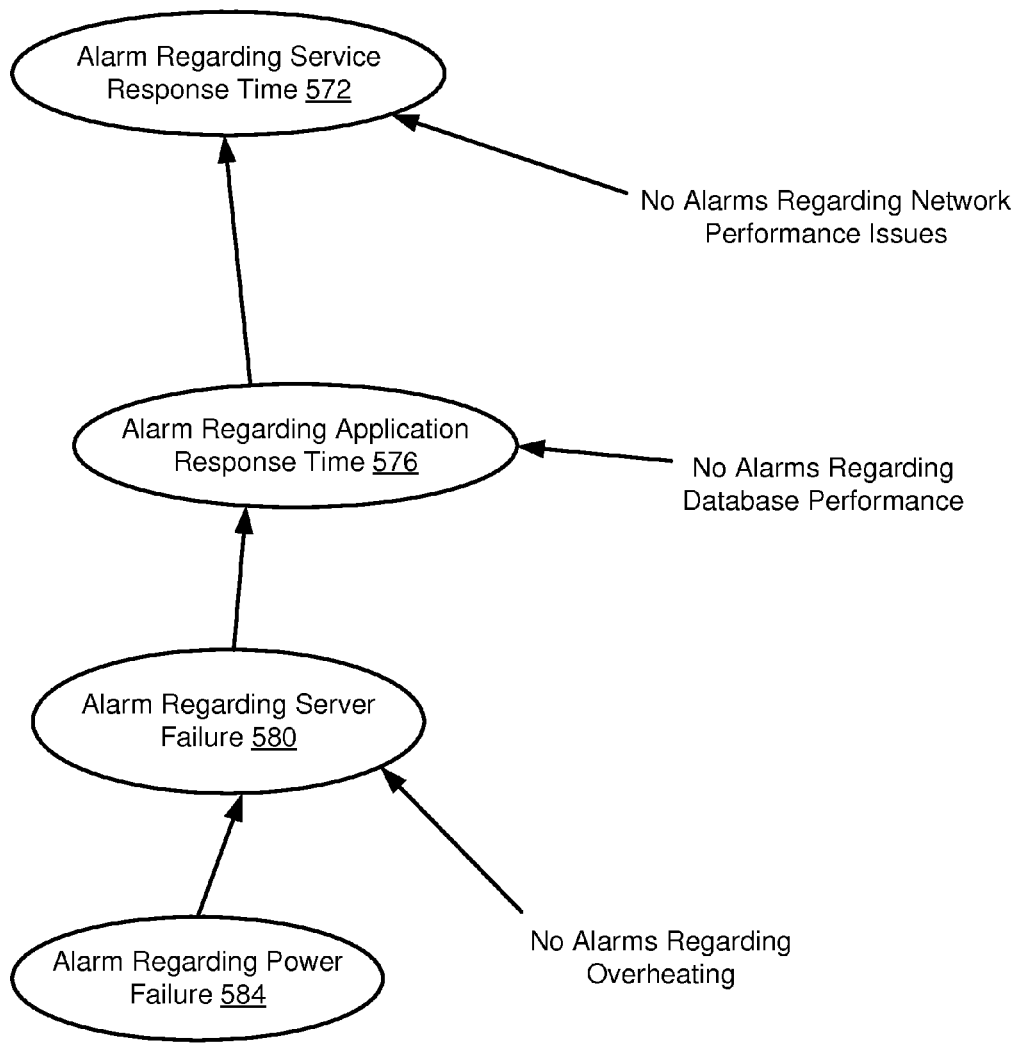
FIG. 5B depicts one embodiment of a failure graph generated using the failure graph template of FIG. 5A.

FIG. 5A depicts one embodiment of a failure graph template 550. FIG. 5B depicts one embodiment of a failure graph 560 generated using the failure graph template 550 of FIG. 5A.

The failure graph template 550 includes a service failure node 502 that is the root node of the failure graph template 550, an application failure node 506 with a directed edge towards the service failure node 502, a network connection failure to application server node 504 with a directed edge towards the service failure node 502, a server failure node 510 with a first directed edge to the application failure node 506 and a second directed edge to a virtual machine failure node 512, a database failure node 508 with a directed edge to the application failure node 506. The virtual machine failure node 512 has a directed edge to the application failure node 506. The failure graph template 550 includes a power failure node 514 with a directed edge to the server failure node 510 and an overheating failure node 516 with a directed edge to the server failure node 510.

A failure graph template may include a root node, such as service failure node 502, and one or more predecessor notes. The root node may comprise a node without any directed edges from the node to another node. The root node may correspond with a failure within a networked computing environment for which a root cause is sought. In one embodiment, each node in a failure graph template may correspond with an individual alarm or a collection of alarms acquired from a plurality of monitoring applications monitoring the networked computing environment. For example, each node in a failure graph template may correspond with a particular type of alarm at a particular level in a networked computing environment (e.g., CPU utilization alarms associated with a particular server or application performance alarms associated with a particular application).

In some embodiments, a failure graph template may comprise a directed acyclic graph. In another embodiment, a failure graph template may comprise a Bayesian network with causal relationship probabilities assigned to each of the directed edges. The causal relationship probabilities may be stored in tables linked to the edges of the failure graph template. In this case, the structure of the failure graph template and the assigned probabilities may be learned from data aggregated from a plurality of monitoring applications monitoring a networked computing environment. In one example, the graph structure of the Bayesian network may be determined using machine learning techniques based on the aggregated data and changes in the aggregated data over time (e.g., the aggregated data may be used as training data for learning the causal relationships between the nodes over time).

In some embodiments, structural equation models may be used to determine the causal relationships associated with the directed edges in a failure graph. In one example, a structural equation model (SEM) may be represented using a causal graph (or a causal structure). The causal graph may comprise a directed acyclic graph (DAG) in which the vertices of the DAG correspond with variables and the edges of the DAG correspond with whether there is a direct causal relationship between two of the variables. If a directed edge runs from a first node of the DAG to a second node of the DAG, then the first node may be referred to as a parent node of the second node (i.e., an ancestor) and the second node may be referred to as a child node of the first node (i.e., a descendant). In another example, a SEM may be represented using a set of equations, wherein each equation of the set of equations describes a variable in terms of other variables which are its direct causes.

In some cases, the causal relationships may be determined by taking into account both observational data (e.g., aggregated data and the changes to the aggregated data over time) and interventional data. An intervention may comprise a controlled experiment, wherein values are assigned to one or more variables. In some cases, interventions may be used to evaluate causal counterfactual conditionals and to answer counterfactual questions, such as what other failures in a networked computing environment would occur if a particular failure occurred associated with an intervention. The interventions may be applied to a test environment that mirrors a production-level networked computing environment. After the interventions have been performed, the consequences of the interventions may be observed to identify the causal relationships. Thus, causal relationships may be determined by both passively observing data (e.g., monitoring the alarms naturally occurring within a networked computing environment over a particular period of time) and by actively forcing failures to occur to a test environment that mirrors the networked computing environment.

In some embodiments, the SEM that best fits both the observational data and the interventional data may be determined using a constraint-based learning approach and/or a search-and-score-based learning approach. A constraint-based learning approach determines a list of invariance properties (e.g., conditional independencies) implied in the observational data and then rules out all causal structures which are incompatible with the list of invariance properties. A search-and-score-based learning approach generates a first causal structure, computes a score for the first causal structure, and then iteratively generates modified causal structures derived from the first causal structure, and scores the modified causal structures. This procedure may be repeated over many generations of modified causal structures in order to determine the causal structure that produces the best score.

In one embodiment, an initial causal graph may be generated based on the layers associated with a networked computing environment. For example, alarms corresponding with a computing system layer may be assigned to ancestor nodes of alarms corresponding with an application layer. After the initial model has been generated, it may be modified in order to find the best fit with both the observational data and the interventional data. In some cases, the constraint-based approach and the search-and-score-based approach may be combined to form a hybrid approach. More information regarding the use of interventions for determining causal relationships and for using a calculus of counterfactuals may be found in Pearl, Judea. Causality: Models, Reasoning, and Inference (Cambridge University Press, 2009).

As depicted in FIG. 5A, the failure graph template 550 may represent causal relationships between potential failures for the service failure node 502. The service failure node 502 may correspond with an alarm generated from a service-level monitor, such as service-level monitor 302 in FIG. 3. In one example, the service failure node 502 may correspond with the unavailability of a software service. The failure graph template 550 may include directed edges corresponding with causal relationships between pairs of nodes in the failure graph template. A directed edge in the failure graph template may represent that a first failure is a direct consequence of another failure. For example, the first failure may correspond with a first node in the failure graph template with a directed edge to a second node in the failure graph template corresponding with a second failure that is a direct consequence of the first failure. In this case, the directed edge represents a causal relationship between the first failure and the second failure. In one embodiment, the failure graph template 550 may be used by a root cause identification tool, such as root cause identification manager 330 in FIG. 3, to determine causal relationships between failures occurring within a networked computing environment and to generate a failure graph, such as failure graph 560 in FIG. 5B.

Referring to FIG. 5B, upon detection of an alarm regarding service response time 572 from a service-level monitor, the root cause identification tool may map the alarm regarding service response time 572 to a root node of a failure graph template. The failure graph template may be one of a plurality of failure graph templates. Each of the plurality of failure graph templates may correspond with different types of failures occurring within a networked computing environment. In this case, the alarm regarding service response time 572 is mapped to the root node of failure graph template 550 in FIG. 5A. Using the failure graph template 550, the root cause identification tool may then look for alarms associated with network connection failures to an application server running an application. The application with a slow response time and the application server with which to find network connection failures may be identified using an infrastructure mapping for the service at the time that the service response time issue occurred, such as infrastructure mapping 450 in FIG. 4.

Once the application causing the service response time issue and the application server running the application have been identified, the root cause identification tool may analyze the alarms generated from a network-level monitor for potential network performance issues. In this case, no alarms were found regarding any network performance issues with the network connection to the application server. Next, the root cause identification tool may then analyze alarms associated with the application. In this case, an alarm regarding application response time 576 is found and mapped to a node corresponding with the application failure node 506 in FIG. 5A. After the application failure has been found, a server running the application with the response time issue may be identified using the infrastructure mapping. As a virtual machine was not used for running the application, alarms associated with a virtual machine failure did not need to be considered by the root cause identification tool. Once the server running the application has been identified, the root cause identification tool may analyze the alarms generated from a system-level monitor for server-related performance issues. In this case, an alarm regarding server failure 580 is found and mapped to a node corresponding with the server failure node 510 in FIG. 5A. After the server failure has been found, the root cause identification tool may then check for overheat failures and power failures potentially causing the server failure. In this case, no alarms regarding overheating were found and an alarm regarding power failure 584 is found and mapped to a node corresponding with the power failure node 514 in FIG. 5A.

As depicted in FIG. 5B, the failure graph 560 includes a leaf node corresponding with the alarm regarding power failure 584 and a root node corresponding with the alarm regarding service response time 572. A path from the leaf node of the failure graph to the root node of the failure graph including the nodes 584, 580, 576, and 572 comprises a chain of failures. Although only a single chain of failures is depicted in FIG. 5B, a failure graph may include more than one failure chain. In cases were multiple failure chains exist, a particular chain of failures within the failure graph may be determined based on an estimated time to fix a failure associated with the leaf node of the particular chain of failures. In other cases, a particular chain of failures within the failure graph may be determined based on a length of the particular chain of failures (e.g., the chain of failures with the fewest number of nodes in the path).

Figure 6A:
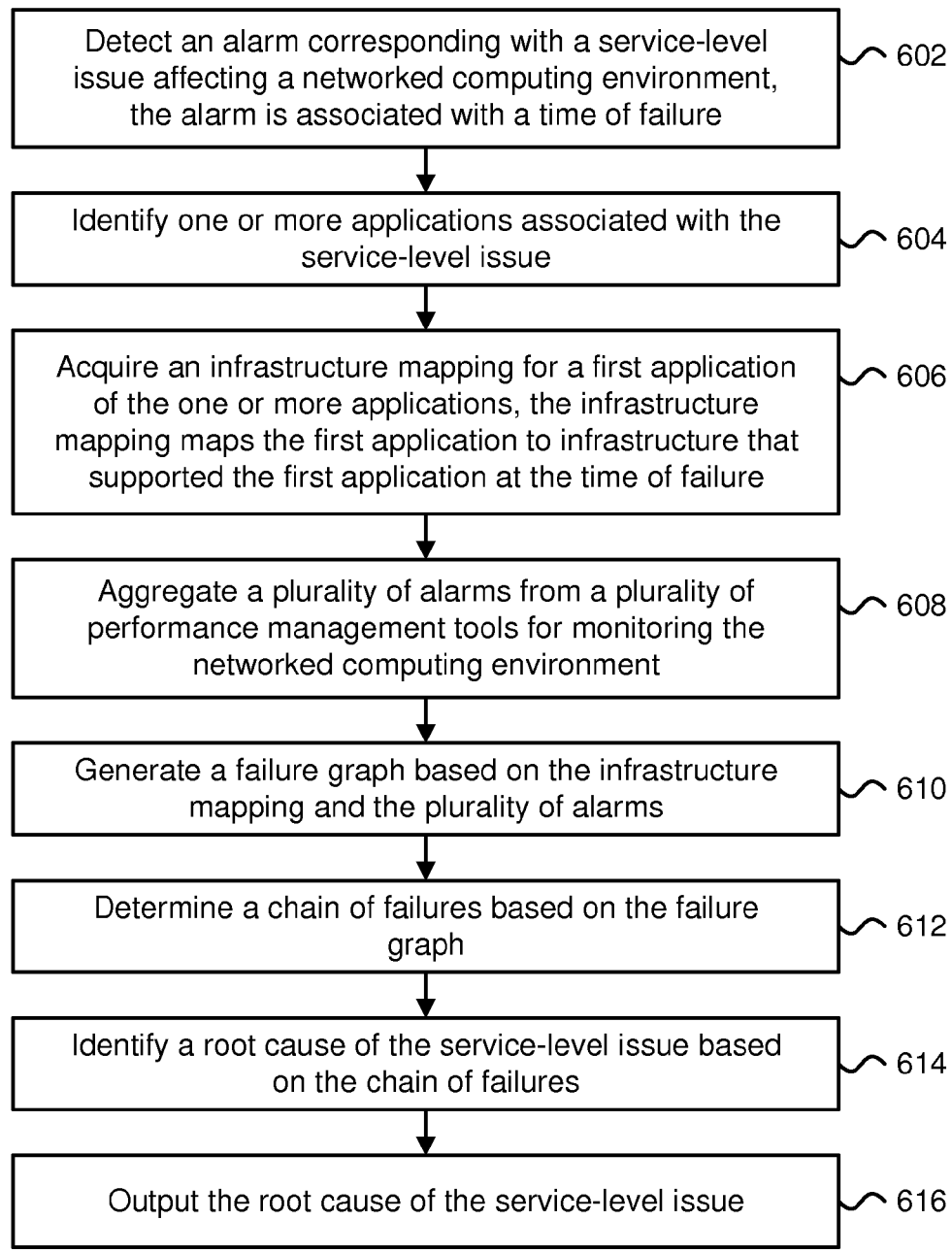
FIG. 6A is a flowchart describing one embodiment of a process for identifying a root cause of a failure or performance-related issue within a networked computing environment.

FIG. 6A is a flowchart describing one embodiment of a process for identifying a root cause of a failure or performance-related issue within a networked computing environment. In one embodiment, the process of FIG. 6A is performed by a server, such as server 158 in FIG. 1.

In step 602, an alarm corresponding with a service-level issue affecting a networked computing environment is detected. The service-level issue may correspond with a service provided by the networked computing environment. The alarm may be associated with a time of failure (e.g., using a timestamp). The service-level issue may correspond with the unavailability or non-responsiveness of one or more applications required by a service. In step 604, one or more applications associated with the service-level issue are identified. The one or more applications may be identified using an infrastructure mapping for the service at the time of failure, such as infrastructure mapping 450 in FIG. 4. In step 606, an infrastructure mapping for a first application of the one or more applications is acquired. The infrastructure mapping maps the first application to infrastructure (or components of the networked computing environment) that supported the first application at the time of failure. In step 608, a plurality of alarms from a plurality of performance management tools for monitoring the networked computing environment is aggregated. The plurality of alarms may be stored in an aggregated data database, such as aggregated data database 337 in FIG. 3.

In step 610, a failure graph is generated based on the infrastructure mapping and the plurality of alarms. One embodiment of a process for generating a failure graph is described later in reference to FIG. 6C. In step 612, a chain of failures is determined based on the failure graph. The chain of failures may include a leaf node of the failure graph and the root node of the failure graph. In step 614, a root cause of the service-level issue is identified based on the chain of failures. In step 616, the root cause of the service-level issue is outputted. In one embodiment, the root cause of the service-level issue is transmitted to a target recipient based on a role associated with the target recipient. In another embodiment, a help desk ticket is automatically generated for fixing a failure associated with the leaf node of the chain of failures.

In some embodiments, a software service provided by a networked computing environment may experience a service-related performance or availability issue (e.g., the software service may not be available to end users or the response time for the software service to the end users may be more than a threshold amount of time). In response to detecting the service-related issue affecting the service (e.g., an alarm is received regarding unavailability of the service), a root cause identification tool may aggregate data from a plurality of information technology management software tools monitoring the networked computing environment, identify causal relationships between a plurality of failures associated with the service-related issue based on the aggregated data, determine a chain of failures of the plurality of failures based on the causal relationships, identify a root cause of the service-related issue based on the chain of failures, and transmit an alarm corresponding with the root cause (e.g., sending a text message to a system administrator responsible for maintenance of a hardware device associated with the root cause).

The aggregated data may include alarms from various monitoring applications monitoring the networked computing environment, such as an application performance management tool and a network performance management tool, as well as log files generated by devices within the networked computing environment. Each of the alarms may correspond with a possible failure associated with the service-related issue. The alarms may be classified as failures correlated with the service-related issue and mapped to nodes in a failure graph, wherein each failure corresponds with a node in the failure graph and directed edges in the failure graph determine whether a failure is a direct consequence of another failure in the failure graph. For example, a first failure may correspond with a first node in the failure graph with a directed edge to a second node in the failure graph corresponding with a second failure that is a direct consequence of the first failure. In this case, the directed edge represents a causal relationship between the first failure and the second failure. The root node of the failure graph may correspond with the highest-level failure (e.g., the service-related issue) in the failure graph. The leaf nodes in the failure graph may correspond with root causes of the highest-level failure. The leaf nodes may comprise nodes without any predecessor nodes or nodes without any incoming directed edges from another node. A chain of failures may comprise a path from a leaf node in the failure graph to the root node of the failure graph. In some embodiments, the failure graph may comprise a directed acyclic graph.

In some cases, the alarms associated with failures occurring at different layers within the networked computing environment may be mapped to different nodes in the failure graph. In one embodiment, the nodes of the failure graph may include a service layer node (e.g., a performance-related issue associated with providing a payment processing service), a network layer node (e.g., associated with networking issues related to providing network connections to end users of the payment processing system), an application layer node (e.g., associated with application issues for applications required to provide the payment processing system), an access control layer node (e.g., associated with data access issues for an application), a virtualization layer node (e.g., associated with virtual machine issues), a computing systems layer node (e.g., associated with physical processor hardware issues), a storage systems layer node (e.g., associated with physical storage hardware issues), a temperature control layer node (e.g., associated with temperature regulation issues affecting the computing and storage hardware), and a power delivery layer node (e.g., associated with power delivery issues to the computing and storage hardware). In another embodiment, a networked computing environment may be divided into layers, with each layer corresponding with a different class of entities (e.g., processors, applications, networks, power supplies, switches, etc.). The nodes of the failure graph may then correspond with the different classes of entities within the networked computing environment.

Figure 6B:
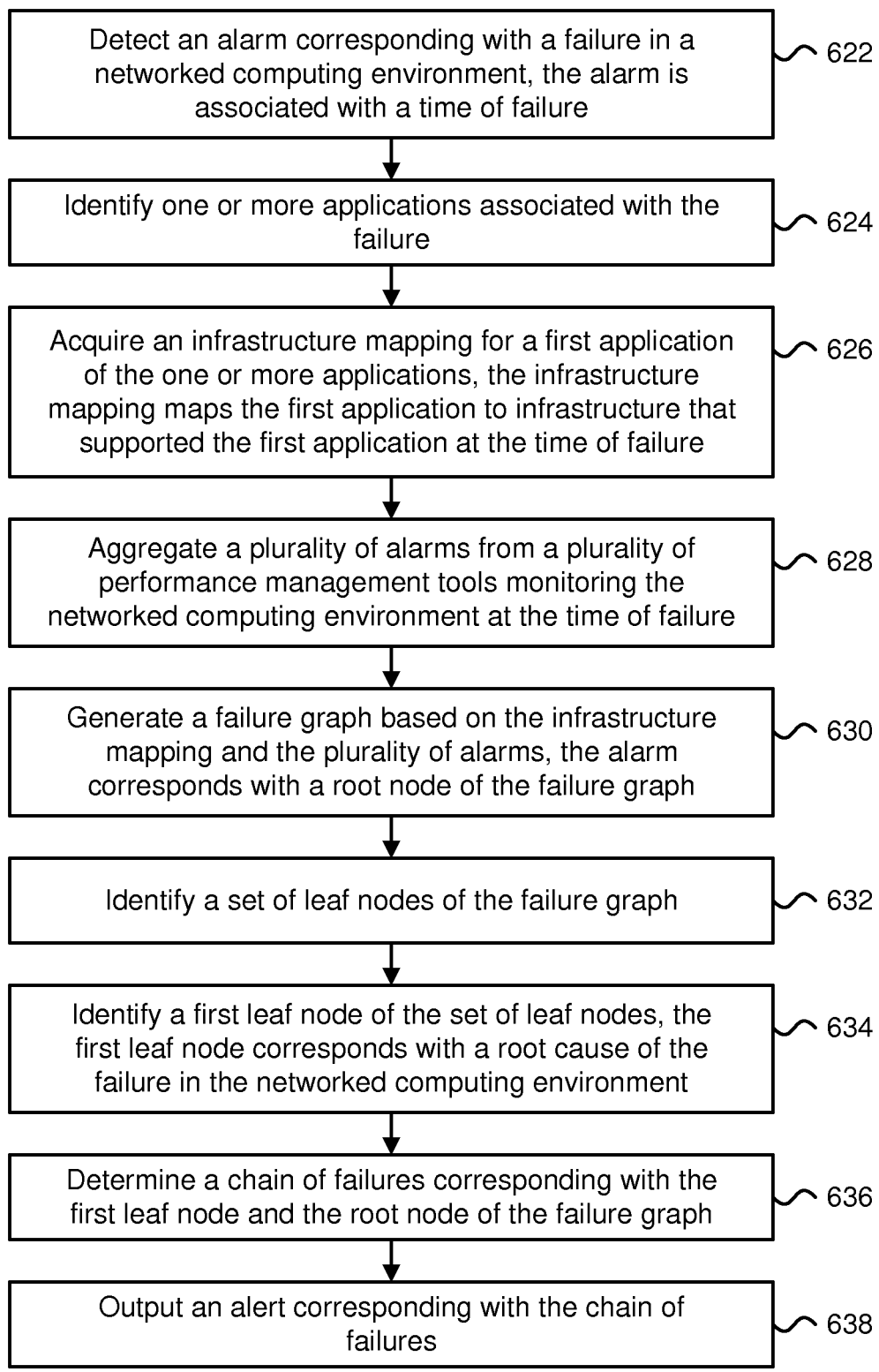
FIG. 6B is a flowchart describing an alternative embodiment of a process for identifying a root cause of a failure or performance-related issue within a networked computing environment.

FIG. 6B is a flowchart describing an alternative embodiment of a process for identifying a root cause of a failure or performance-related issue within a networked computing environment. In one embodiment, the process of FIG. 6B is performed by a server, such as server 158 in FIG. 1.

In step 622, an alarm corresponding with a failure in a networked computing environment is detected. The alarm may be associated with a time of failure. The alarm may be acquired from an application-level monitor, such as application-level monitor 306 in FIG. 3. In step 624, one or more applications associated with the failure are identified. In one embodiment, the one or more applications may be identified by first identifying a service associated with the failure and then determining the one or more applications supporting the service at the time of failure. In step 626, an infrastructure mapping for a first application of the one or more applications is acquired. The infrastructure mapping maps the first application to infrastructure (e.g., various components within the networked computing environment) that supported the first application at the time of failure.

In step 628, a plurality of alarms from a plurality of performance management tools monitoring the networked computing environment at the time of failure is aggregated. The plurality of alarms may be stored in an aggregated data database, such as aggregated data database 337 in FIG. 3. In step 630, a failure graph is generated based on the infrastructure mapping and the plurality of alarms. The alarm may correspond with a root node of the failure graph. One embodiment of a process for generating a failure graph is described later in reference to FIG. 6C.

In step 632, a set of leaf nodes of the failure graph is identified. In step 634, a first leaf node of the set of leaf nodes is identified. The first leaf node may correspond with a root cause of the failure in the networked computing environment. In step 636, a chain of failures corresponding with the first leaf node and the root node of the failure graph is determined. In step 638, an alert corresponding with the chain of failures is outputted.

In one embodiment, the chain of failures is determined based on a length of the chain of failures. For example, the chain of failures may comprise the shortest chain of failures in the failure graph (i.e., a chain of failures with the fewest number of nodes). In another embodiment, the chain of failures may be determined based on a number of alarms that are a consequence of the leaf node of the chain of failures. In one example, the chain of failures may include a leaf node in which fixing the failure associated with the leaf node will fix the greatest number of unresolved alarms of the plurality of alarms. As an example, fixing a leaf node failure associated with fixing a power supply issue affecting a server rack which in turn affects tens of servers and thousands of applications may be given priority over fixing a memory utilization issue affecting only a single server. In another embodiment, the chain of failures may be determined based on an estimated time to fix a failure associated with the leaf node of the chain of failures.

Figure 6C:
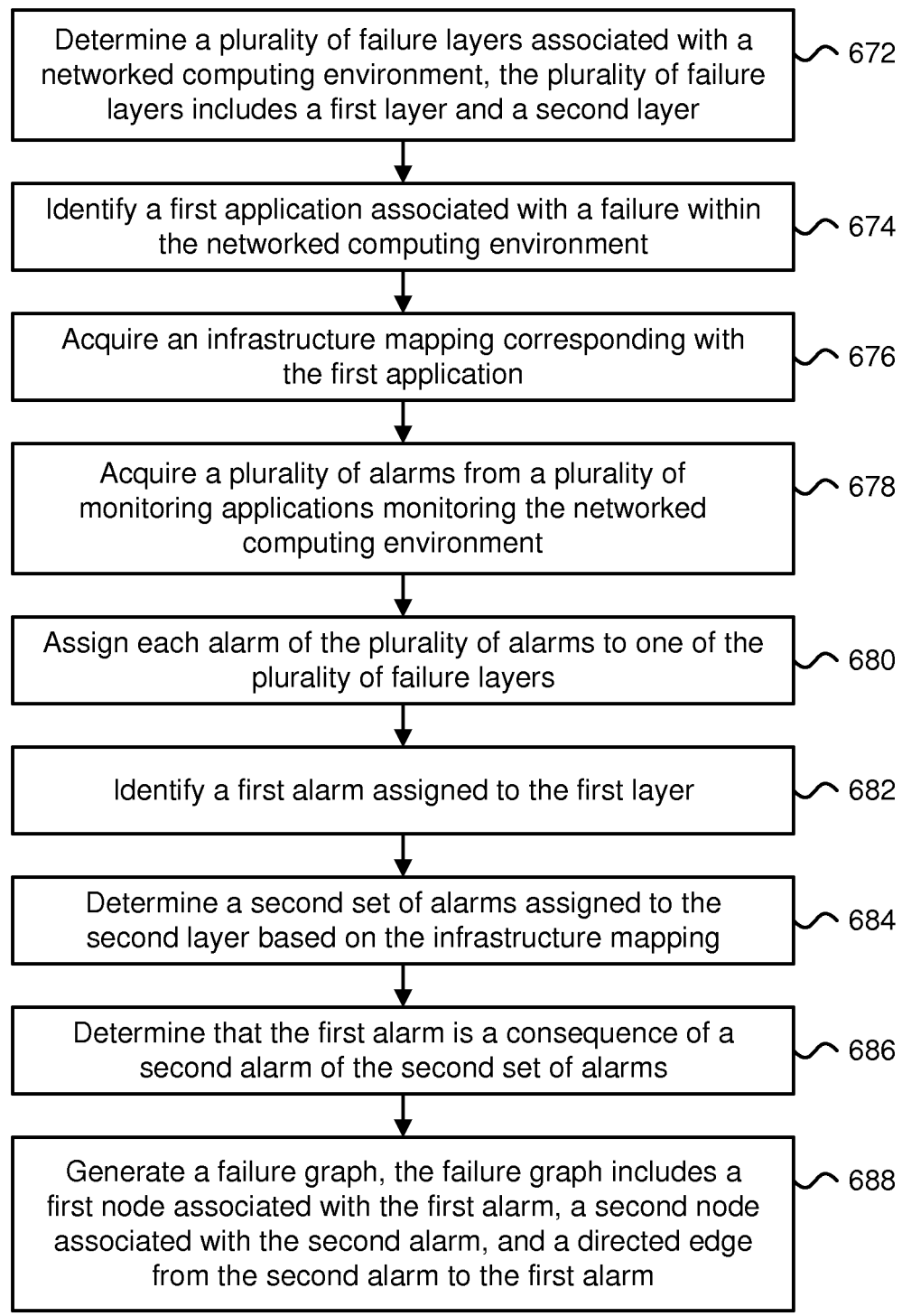
FIG. 6C is a flowchart describing one embodiment of a process for generating a failure graph.

FIG. 6C is a flowchart describing one embodiment of a process for generating a failure graph. The process described in FIG. 6C is one example of a process for implementing step 610 in FIG. 6A or for implementing step 630 in FIG. 6B. In one embodiment, the process of FIG. 6C is performed by a server, such as server 158 in FIG. 1.

In step 672, a plurality of failure layers associated with a networked computing environment is determined. The plurality of failure layers may include a first layer and a second layer. In one embodiment, the plurality of failure layers may include a service layer (e.g., covering performance-related issues associated with providing a payment processing service), a network layer (e.g., covering networking issues related to providing network connections to end users of the payment processing system), an application layer (e.g., covering application issues for applications required to provide the payment processing system), a virtualization layer (e.g., covering virtual machine issues), a computing systems layer (e.g., covering physical processor hardware issues), a storage systems layer (e.g., covering physical storage hardware issues), a temperature control layer (e.g., covering temperature regulation issues affecting the computing and storage hardware), and a power delivery layer (e.g., covering power delivery issues to the computing and storage hardware). In another embodiment, the plurality of layers may correspond with different classes of entities associated with the networked computing environment (e.g., processors, applications, networks, power supplies, switches, etc.).

In step 674, a first application associated with a failure within the networked computing environment is identified. If the failure comprises a system-level failure, then a lookup table of applications running at the time of the failure supporting the service may be used to identify the first application. If the failure comprises an application failure, then an alarm associated with the failure acquired from an application-level monitor may provide an identification of the first application. In step 676, an infrastructure mapping corresponding with the first application is acquired. In one embodiment, the infrastructure mapping may provide a mapping of the first application to the infrastructure or components of the networked computing environment that supported the first application at the time of the failure.

In step 678, a plurality of alarms from a plurality of monitoring applications monitoring the networked computing environment at the time of the failure is acquired. In step 680, each alarm of the plurality of alarms is assigned to one of the plurality of failure layers. In one example, a first alarm generated by an application-level monitor may be mapped to an application layer of the plurality of failure layers. In step 682, a first alarm assigned to the first layer is identified. The first alarm may be mapped to a root node of a failure graph. The first alarm may correspond with a failure within the networked computing environment for which a root cause is sought.

In some embodiments, a failure graph template, such as failure graph template 550 in FIG. 5A, may be used to determine causal relationships between failures occurring within the networked computing environment and to generate a failure graph, such as failure graph 560 in FIG. 5B. In some embodiments, a failure graph template may comprise a directed acyclic graph representing causal relationships between failures occurring within a networked computing environment. In another embodiment, a failure graph template may comprise a Bayesian network with causal relationship probabilities assigned to each of the directed edges. The causal relationship probabilities may be stored in tables linked to the edges of the failure graph template. In this case, the structure of the failure graph template and the assigned probabilities may be learned from data aggregated from a plurality of monitoring applications monitoring a networked computing environment. In one example, the graph structure of the Bayesian network may be determined using machine learning techniques based on the aggregated data and changes in the aggregated data over time (e.g., the aggregated data may be used as training data for learning the causal relationships between the nodes over time).

In step 684, a second set of alarms assigned to the second layer is determined based on the infrastructure mapping. In step 686, it is determined that the first alarm is a consequence of a second alarm of the second set of alarms. In one embodiment, it may be determined that the first alarm is a consequence of the second alarm based on the presence of a directed edge within a corresponding failure graph template. In another embodiment, it may be determined that the first alarm is a consequence of the second alarm based on aggregated data acquired from a plurality of monitoring applications monitoring the networked computing environment. The aggregated data may include log file data associated with the plurality of alarms. The aggregated data may also include help desk ticket data associated with human-entered help desk tickets covering failures and performance issues affecting the networked computing environment. In some cases, the help desk tickets may be treated as additional alarms to the plurality of alarms. In step 688, a failure graph is generated. The failure graph may include a first node associated with the first alarm, a second node associated with the second alarm, and a directed edge from the second alarm to the first alarm.

Figure 7A:
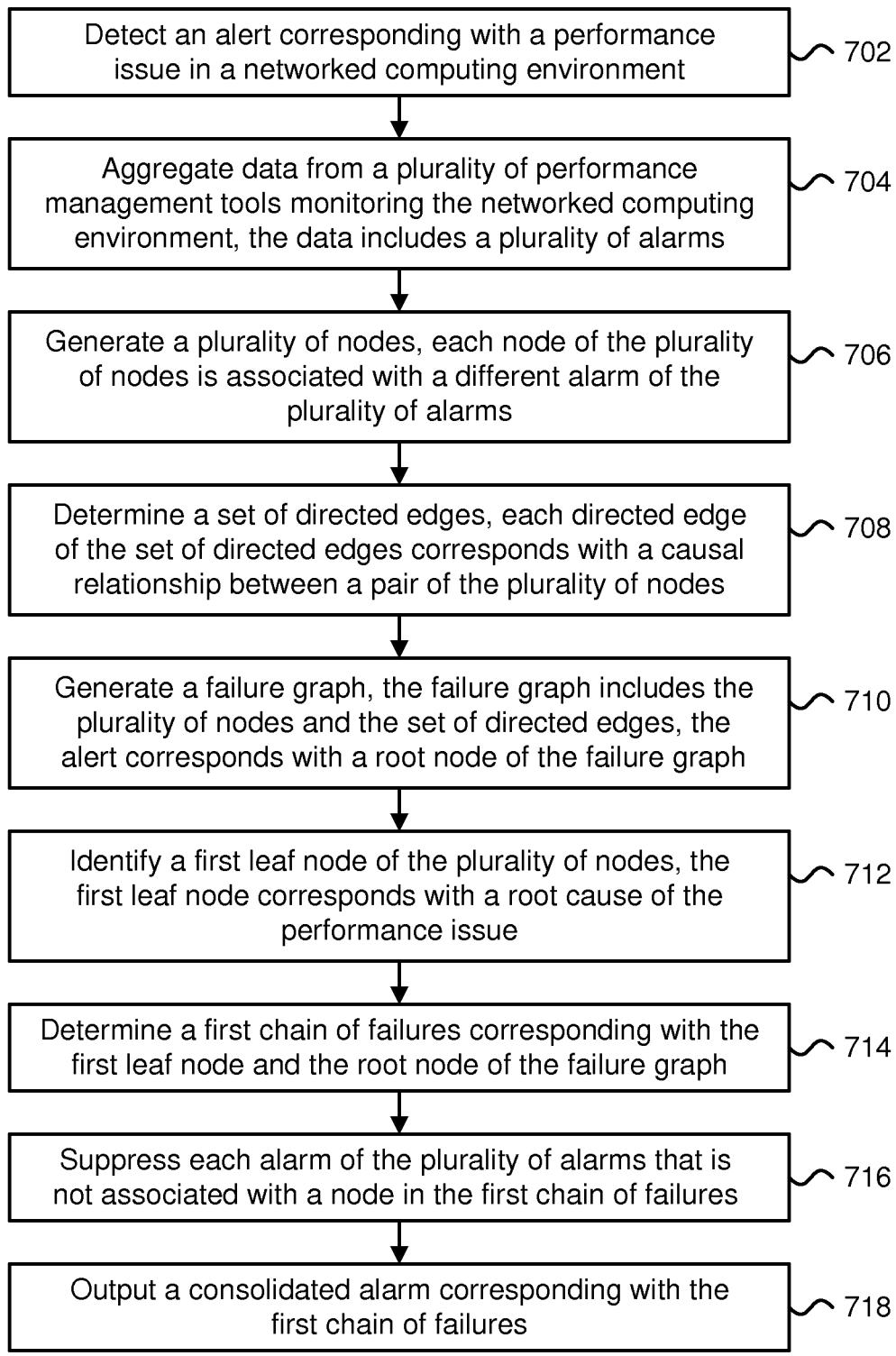
FIG. 7A is a flowchart describing one embodiment of a process for consolidating multiple alarms generated from a plurality of monitoring applications monitoring a networked computing environment under a single root cause.

FIG. 7A is a flowchart describing one embodiment of a process for consolidating multiple alarms generated from a plurality of monitoring applications monitoring a networked computing environment under a single root cause. In one embodiment, the process of FIG. 7A is performed by a server, such as server 158 in FIG. 1.

In step 702, an alert corresponding with a performance issue in a networked computing environment is detected. The performance issue may comprise a failure of a component of the networked computing environment. The alert may be acquired from an application-level monitor, such as application-level monitor 306 in FIG. 3. In some embodiments, the alert may be generated by the application-level monitor if a current performance metric is outside an acceptable range. As an acceptable range of application performance may vary over time due to varying conditions, such as server loads, end user usage patterns, day of the week or month (e.g., weekend days, weekdays, and holidays), time of day (e.g., during working hours vs. non-working hours), and load patterns (e.g., batch mode processing may be performed at a particular time of day), different baselines of application performance may be determined for the varying conditions. In one example, an acceptable range for application response time may vary based on the time of day and day of the week.

In step 704, data from a plurality of performance management tools monitoring the networked computing environment is aggregated. The aggregated data may include a plurality of alarms. The aggregated data may also include log file data associated with the plurality of alarms, as well as help desk ticket data associated with human-entered help desk tickets covering failures and performance issues affecting the networked computing environment.

In step 706, a plurality of nodes is generated. Each node of the plurality of nodes may be associated with a different alarm of the plurality of alarms. In step 708, a set of directed edges is determined. Each directed edge of the set of directed edges may correspond with a causal relationship between a pair of the plurality of nodes. In step 710, a failure graph is generated. The failure graph may include the plurality of nodes and the set of directed edges. The alert may correspond with a root node of the failure graph. One embodiment of a process for generating a failure graph was described in reference to FIG. 6C.

In step 712, a first leaf node of the plurality of nodes is identified. The first leaf node may correspond with a root cause of the performance issue. In step 714, a first chain of failures corresponding with the first leaf node and the root node of the failure graph is determined. In step 716, each alarm of the plurality of alarms that is not associated with a node in the first chain of failures is suppressed. In one example, each alarm of the plurality of alarms that is not associated with the first chain of failures may be hidden or not reported to a target recipient. In step 718, a consolidated alarm corresponding with the first chain of failures is outputted. The consolidated alarm may comprise a report or other message specifying the leaf node of the first chain of failures. The message specifying a failure associated with the leaf node may be transmitted to a target recipient.

In some embodiments, in response to detecting an alert corresponding with a service-level failure affecting a service provided by a networked computing environment, a root cause identification tool may aggregate a plurality of alarms from a plurality of performance management tools monitoring the networked computing environment. The root cause identification tool may then generate a failure graph associated with the service-level failure based on the plurality of alarms, determine a first set of leaf nodes of the failure graph, determine a first chain of failures based on the first set of leaf nodes, suppress (or hide) alarms that are not associated with the first chain of failures, and output a consolidated alarm associated with the first chain of failures. In one example, the consolidated alarm may present information only associated with the leaf node of the first chain of failures. In another example, the consolidated alarm may present information only associated with the leaf node of the first chain of failures and the root node of the first chain of failures.

Figure 7B:
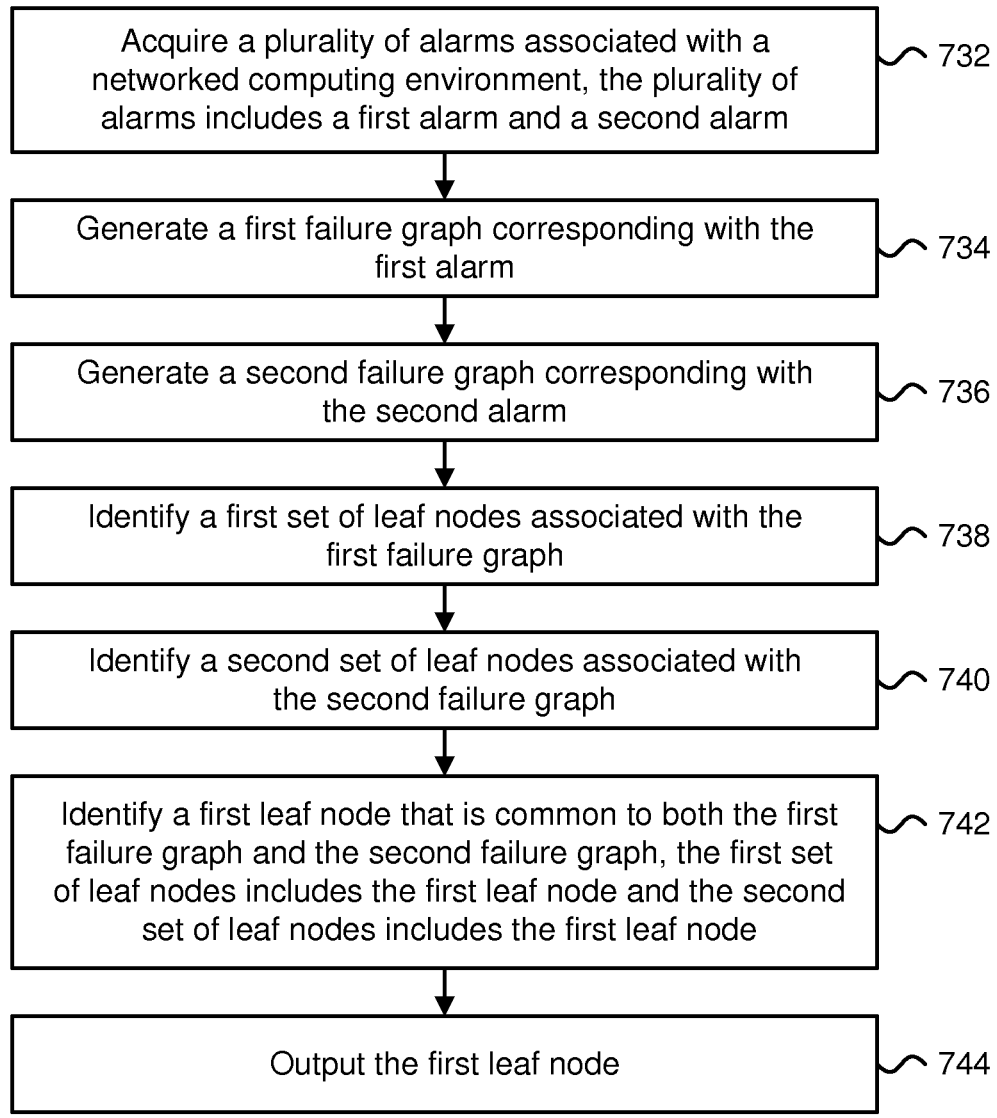
FIG. 7B is a flowchart describing one embodiment of a process for identifying a single root cause for multiple failures occurring in a networked computing environment.

FIG. 7B is a flowchart describing one embodiment of a process for identifying a single root cause for multiple failures occurring in a networked computing environment. In one embodiment, the process of FIG. 7B is performed by a server, such as server 158 in FIG. 1.

In step 732, a plurality of alarms associated with a networked computing environment is acquired. The plurality of alarms may include a first alarm and a second alarm. The first alarm and the second alarm may comprise alarms generated by an application-level monitor, such as application-level monitor 306 in FIG. 3. The first alarm may be associated with a first application being non-responsive and the second alarm may be associated with a second application being non-responsive. In some embodiments, both the first alarm and the second alarm may correspond with two different service-level failures or two different application-level failures occurring within the networked computing environment.

In step 734, a first failure graph corresponding with the first alarm is generated. In step 736, a second failure graph corresponding with the second alarm is generated. In step 738, a first set of leaf nodes associated with the first failure graph is identified. In step 740, a second set of leaf nodes associated with the second failure graph is identified. In step 742, a first leaf node that is common to both the first failure graph and the second failure graph is identified. In this case, the first set of leaf nodes may include the first leaf node and the second set of leaf nodes may include the first leaf node. In step 744, the first leaf node is outputted. In this case, the first leaf node may correspond with a root cause failure that is responsible for generating both the first alarm and the second alarm.

In some embodiments, a plurality of failure graphs corresponding with different failures occurring within the networked computing environment may be generated and a common root cause for the root nodes of the plurality of failure graphs may be identified. In one embodiment, a common leaf node (i.e., a common root cause) associated with the plurality of failure graphs may be identified and outputted as a root cause of the different failures. In one example, two alarms corresponding with the failures of two different applications may be detected, two failure graphs may then be generated corresponding with the two alarms, and a leaf node that is common to both of the two failure graphs may be identified (e.g., if a server running the two different applications has crashed taking down both applications, then the server failure may comprise a common root cause problem for both of the application failures). In another example, a common root cause failure leading to multiple alarms may correspond with a single power failure (e.g., a power failure to a server rack housing multiple servers running numerous applications) or a temperature regulation failure (e.g., a cooling system failure affecting a particular region within a data center).

Figure 8A:
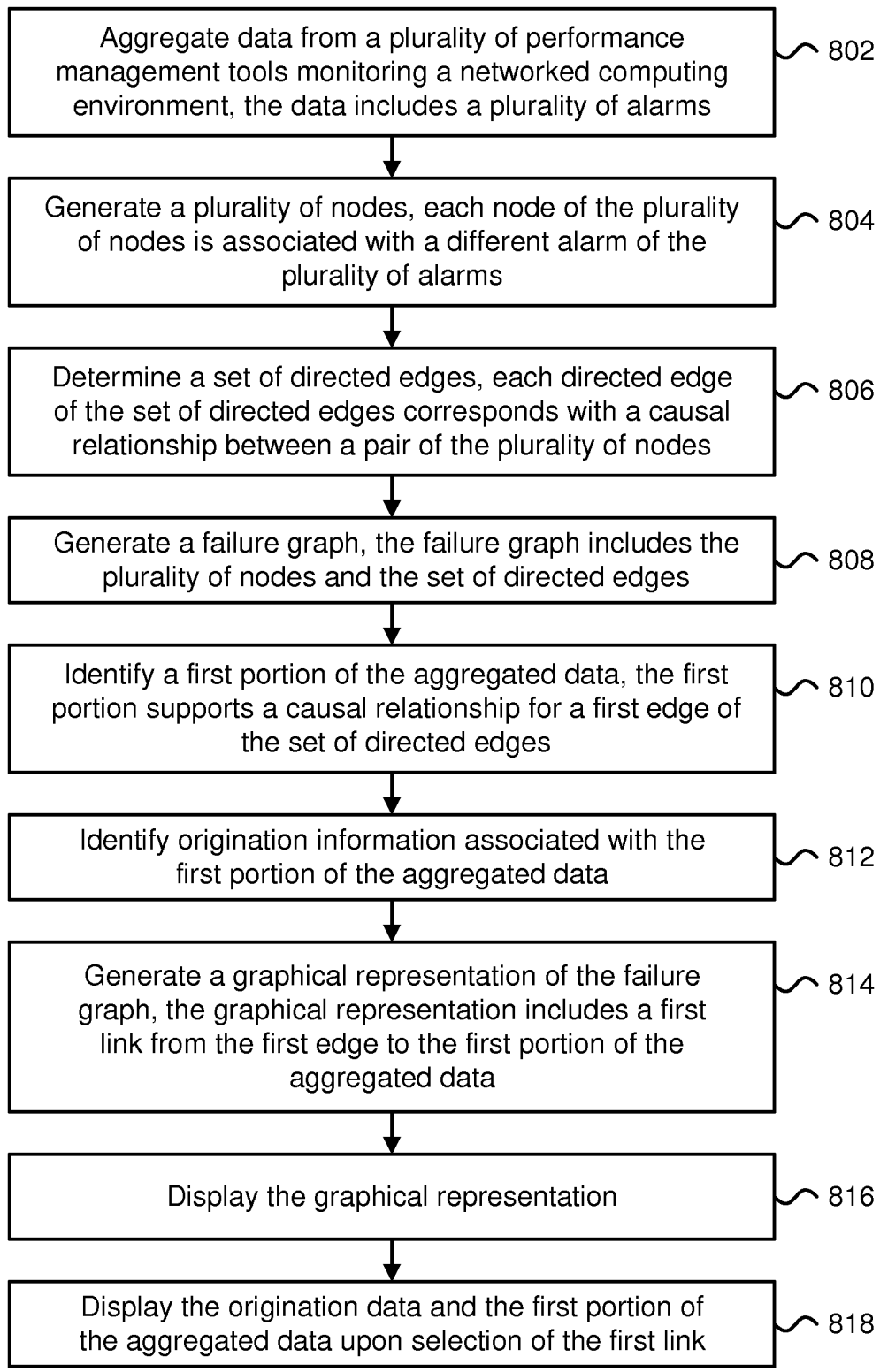
FIG. 8A is a flowchart describing one embodiment of a process for visualizing and accessing data associated with causal relationships between failures occurring within a networked computing environment.

FIG. 8A is a flowchart describing one embodiment of a process for visualizing and accessing data associated with causal relationships between failures occurring within a networked computing environment. In one embodiment, the process of FIG. 8A is performed by a server, such as server 158 in FIG. 1.

In step 802, data from a plurality of performance management tools monitoring a networked computing environment is aggregated. The aggregated data may include a plurality of alarms, as well as log files generated by devices within the networked computing environment. In step 804, a plurality of nodes is generated. Each node of the plurality of nodes is associated with a different alarm of the plurality of alarms. In step 806, a set of directed edges is determined. Each directed edge of the set of directed edges corresponds with a causal relationship between a pair of the plurality of nodes. In step 808, a failure graph is generated. The failure graph may include the plurality of nodes and the set of directed edges. One embodiment of a process for generating a failure graph was described in reference to FIG. 6C.

In step 810, a first portion of the aggregated data is identified. The first portion supports a causal relationship for a first edge of the set of directed edges. In one embodiment, if the first edge extends from a first node of the plurality of nodes to a second node of the plurality of nodes (i.e., the first edge is a directed edge from the first node to the second node), then the first portion of the aggregated data may include a first alarm associated with the first node and a second alarm associated with the second node. The first portion of the aggregated data may also include a log file generated by a device that triggered the first alarm.

In step 812, origination information associated with the first portion of the aggregated data is identified. The origination information may include an identification of a first monitoring tool that generated the first alarm (e.g., a system-level monitoring tool) and an identification of a second monitoring tool that generated the second alarm (e.g., an application-level monitoring tool). In step 814, a graphical representation of the failure graph is generated. The graphical representation may include circles representing nodes of the failure graph and arrows representing corrected edges of the failure graph. The graphical representation may include a first link from the first edge to the first portion of the aggregated data. The first link may allow an end user to select the first link in order to bring into view the first portion of the aggregated data or cause the first portion of the aggregated data to be displayed. In step 816, the graphical representation is displayed. The graphical representation may be displayed using a computer monitor or a touch-sensitive display. In step 818, the origination data and the first portion of the aggregated data is displayed upon selection of the first link. In one embodiment, the selection of the first link may be made by an end user of a root cause identification tool.

In some embodiments, a failure graph may be generated in response to detecting a performance issue in a networked computing environment. The failure graph may be generated by a root cause identification tool that aggregates data from a plurality of performance management tools monitoring the networked computing environment. The aggregated data may include a plurality of alarms spanning multiple layers of the networked computing environment, as well as log file data (e.g., data from temporary log files generated by an operating system) generated by devices within the networked computing environment (e.g., servers). The root cause identification tool may identify causal relationships between the plurality of alarms based on the aggregated data and generate a failure graph including directed edges corresponding with the causal relationships. The root cause identification tool may generate a graphical representation of the failure graph including pointers to portions of the aggregated data supporting the directed edges. In one example, each edge of the failure graph may correspond with one or more links to portions of the aggregated data supporting the directionality of the edge (e.g., a link to a log file supporting the causal relationship). Each node of the failure graph may correspond with a link to a particular alarm of the plurality of alarms.

In some embodiments, a root cause identification tool may provide a user interface for accessing the portions of the aggregated data pointed to by the various links within the failure graph. The portions of the aggregated data pointed to by a link may also include ownership information (i.e., who is responsible for the data), origination information (i.e., where the data originated from), and physical location information (e.g., a physical location of a server within a data center or a physical location of a router or network switch). The user interface and graphical representation of the failure graph with links to the underlying data provides a quick way to visualize and access the data aggregated from the plurality of performance management tools monitoring the networked computing environment.

In some cases, the user interface may allow an end user of the root cause identification tool to access portions of a metrics store that stores the aggregated data and non-structured information, such as log files. In this case, the failure graph may be used as an index to access the portions of the metrics store relevant to a particular edge or node in the failure graph. The user interface may allow the end user to quickly look up non-structured information using the failure graph as an index to the non-structured information.

Figure 8B:
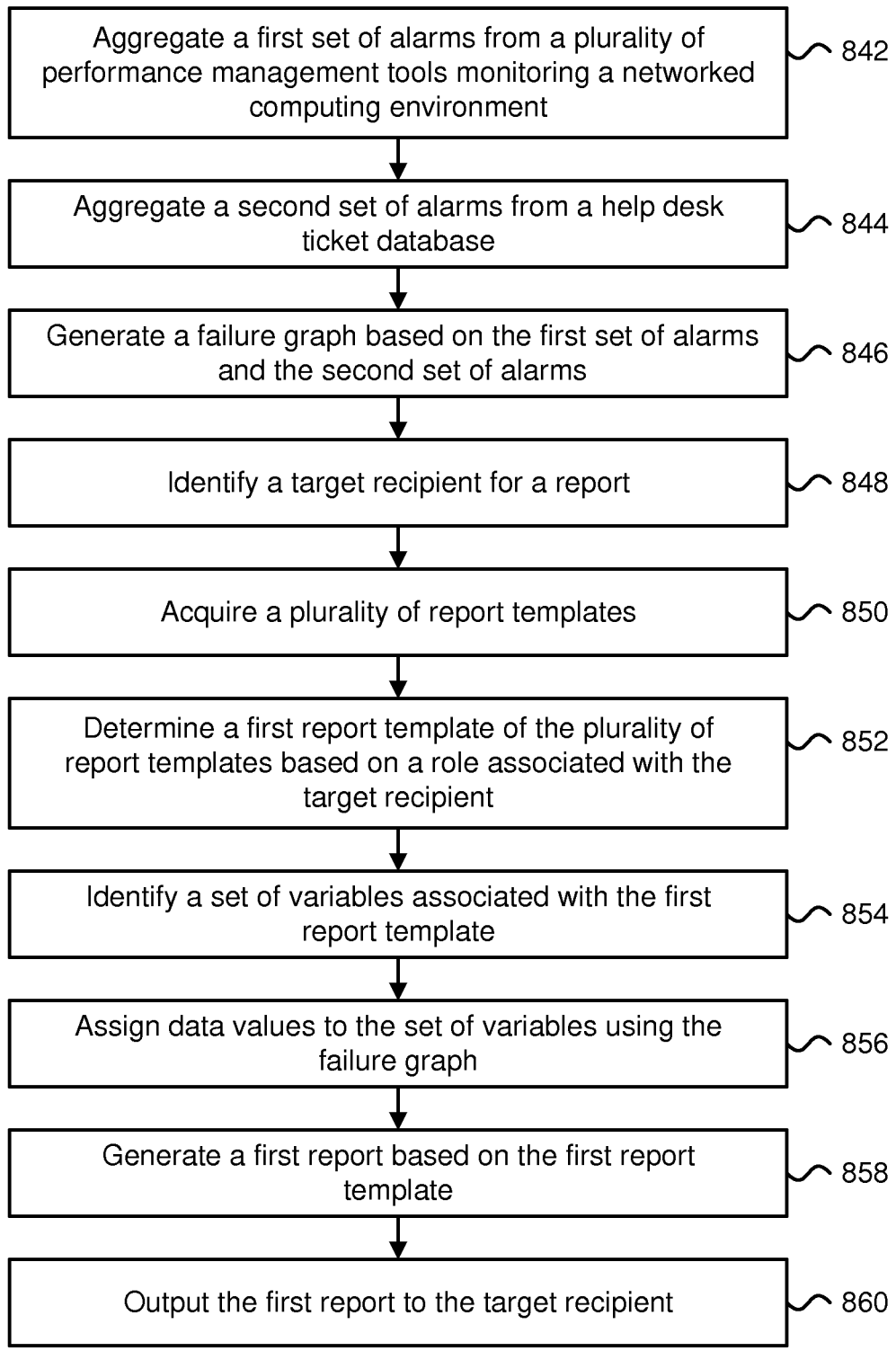
FIG. 8B is a flowchart describing one embodiment of a process for automatically generating a report in response to detecting performance and/or availability issues that occur throughout multiple layers of a networked computing environment based on a role of a target recipient of the report.

FIG. 8B is a flowchart describing one embodiment of a process for automatically generating a report in response to detecting performance and/or availability issues that occur throughout multiple layers of a networked computing environment based on a role of a target recipient of the report. In one embodiment, the process of FIG. 8B is performed by a server, such as server 158 in FIG. 1.

In step 842, a first set of alarms is aggregated from a plurality of performance management tools monitoring a networked computing environment. In step 844, a second set of alarms is aggregated from a help desk ticket database. In step 846, a failure graph is generated based on the first set of alarms and the second set of alarms. One embodiment of a process for generating a failure graph was described in reference to FIG. 6C.

In step 848, a target recipient for a report is identified. In step 850, a plurality of report templates is acquired. Each report template of the plurality of report templates may correspond with a particular employee role or level of responsibility within an organization. In step 852, a first report template of the plurality of report templates is determined based on a role associated with the target recipient (e.g., the target recipient is a system administrator). In step 854, a set of variables associated with the first report template is identified. In step 856, data values are assigned to the set of variables using the failure graph generated in step 846. In one example, the data values may include an identification of a root cause failure. In step 858, a first report is generated based on the first report template. In step 860, the first report is outputted to the target recipient.

In some embodiments, a failure graph may be generated in response to detecting a performance issue in a networked computing environment. The failure graph may be generated by a root cause identification tool that aggregates data from a plurality of performance management tools monitoring the networked computing environment. The aggregated data may include a plurality of alarms spanning multiple layers of the networked computing environment. The root cause identification tool may identify causal relationships between the plurality of alarms based on the aggregated data, generate a failure graph including directed edges corresponding with the causal relationships, and identify a root cause of the performance issue using the failure graph. The root cause identification tool may identify a role associated with a target recipient and output an alert to the target recipient based on the role and an ontology defined for the role (e.g., if the target recipient is a system administrator, then a text message regarding the root cause of the performance issue may be sent to the system administrator).

In one embodiment, the root cause identification tool may acquire a plurality of report templates, determine a first report template of the plurality of report templates based on a role associated with a target recipient, identify a set of variables associated with the first report template, assign data values to the set of variables using the failure graph (e.g., the set of variable may be filled in based on a root cause identified using the failure graph), generate a first report based on the first report template, and output the first report to the target recipient. The role of the target recipient may be determined based on a user name, an employee identification number, or an email address associated with the target recipient. Each of the plurality of report templates may be customized such that only information that is most relevant to a person with a particular role within an organization is displayed or transmitted to the target recipient. For example, a person with a technical role within an organization may receive an alert with technical information (e.g., server utilization information), while a person with a non-technical role within the organization may receive an alert with business-focused information (e.g., the number of people who can currently connect to a particular application or the estimated downtime for the particular application).

In one example, a first end user may login to the root cause identification tool using a user name that is associated with a managerial role and view a first report corresponding with a first report template associated with the managerial role. A second end user may login to the root cause identification tool using a second user name that is associated with a system administrator role and view a second report corresponding with a second report template associated with the system administrator role.

Figure 9:
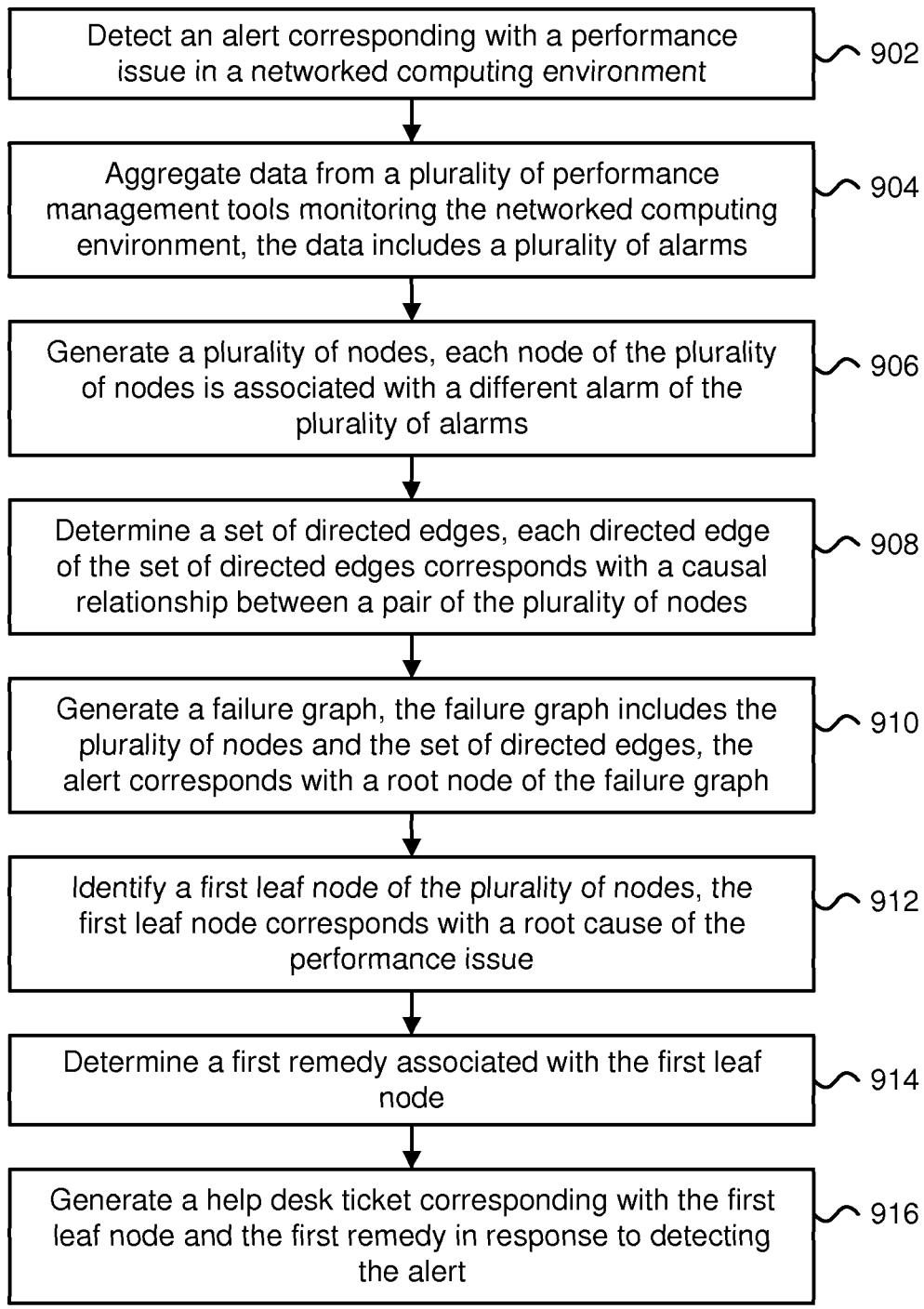
FIG. 9 is a flowchart describing one embodiment of a process for automatically generating help desk tickets in response to detecting performance and/or availability issues that occur throughout multiple layers of a networked computing environment.

FIG. 9 is a flowchart describing one embodiment of a process for automatically generating help desk tickets in response to detecting performance and/or availability issues that occur throughout multiple layers of a networked computing environment. In one embodiment, the process of FIG. 9 is performed by a server, such as server 158 in FIG. 1.

In step 902, an alert corresponding with a performance issue in a networked computing environment is detected. In step 904, data from a plurality of performance management tools monitoring the networked computing environment is aggregated. The aggregated data may include a plurality of alarms, as well as log files generated by devices within the networked computing environment. In step 906, a plurality of nodes is generated. Each node of the plurality of nodes is associated with a different alarm of the plurality of alarms. In step 908, a set of directed edges is determined. Each directed edge of the set of directed edges corresponds with a causal relationship between a pair of the plurality of nodes. In step 910, a failure graph is generated. The failure graph may include the plurality of nodes and the set of directed edges. One embodiment of a process for generating a failure graph was described in reference to FIG. 6C. The alert detected in step 902 may correspond with a root node of the failure graph.

In step 912, a first leaf node of the plurality of nodes is identified. The first leaf node may correspond with a root cause of the performance issue. In step 914, a first remedy associated with the first leaf node is determined. The first remedy may be determined based on a failure layer associated with the first leaf node. For example, if the first leaf node is associated with a system-level failure, then the first remedy may comprise dispatching a server technician or automatically rebooting a server. If the first leaf node is associated with a network-level failure, then the first remedy may comprise dispatching a network technician, limiting external traffic to the network with the performance issue, or redirecting network traffic from the network with the performance issue to a different network. In step 916, a help desk ticket is automatically generated corresponding with the first leaf node and the first remedy in response to detecting the alert in step 902.

In some embodiments, in response to detecting an alert corresponding with a performance issue affecting a networked computing environment, a root cause identification tool may aggregate a plurality of alarms from a plurality of performance management tools monitoring the networked computing environment. The root cause identification tool may then generate a failure graph associated with the performance issue based on the plurality of alarms, identify a first leaf node of the plurality of nodes, determine a first remedy associated with the first leaf node, and generate a help desk ticket corresponding with the first leaf node and the first remedy. In one example, the first leaf node may correspond with a power failure to a particular server (or server rack) and the first remedy may include dispatching a technician to a location associated with the particular server. In this case, the automatically generated help desk ticket may cause a technician to be dispatched to fix the particular server (or a power distribution unit on a server rack supporting the particular server) that is the root cause of many alarms. The automatically generated help desk ticket may specify the failure associated with the first leaf node, the first remedy, a location associated with the first remedy, and an estimated time to fix the failure associated with the first leaf node.

In some embodiments, issue tickets entered into a help desk ticket database may be treated as human generated alarms. For example, a help desk ticket may be created specifying that a particular application is not available. The description provided in the help desk ticket may be parsed for key words and/or the submission of the help desk ticket may require that particular pull-down fields are specified (e.g., regarding the availability of a particular application or the ability to access a particular storage device). The root cause identification tool may then aggregate not only a plurality of alarms from a plurality of performance management tools monitoring the networked computing environment, but also a second set of alarms corresponding with the issue tickets entered into the help desk ticket database. The root cause identification tool may then aggregate the plurality of alarms and the second set of alarms and generate a failure graph associated with the performance issue based on the plurality of alarms and the second set of alarms.

One embodiment comprises a method for integrating help desk ticket tracking with root cause analysis comprising detecting an alert corresponding with a performance issue in a networked computing environment, aggregating data from a plurality of monitoring applications monitoring the networked computing environment, and generating a failure graph based on the aggregated data. The failure graph includes a plurality of nodes and a set of directed edges. Each directed edge of the set of directed edges corresponds with a causal relationship between a pair of the plurality of nodes. The alert corresponds with a root node of the failure graph. The method further comprises identifying a first leaf node of the plurality of nodes. The first leaf node corresponds with a root cause of the performance issue. The method further comprises determining a first remedy associated with the first leaf node and automatically generating a help desk ticket corresponding with the first leaf node and the first remedy in response to detecting the alert.

In some cases, the method further comprise acquiring help desk ticket information associated with help desk tickets entered into a database covering performance issues affecting the networked computing environment and processing the help desk ticket information to identify a second set of alarms. The aggregated data includes a plurality of alarms generated from the plurality of monitoring applications. The generating a failure graph includes generating the failure graph based on the plurality of alarms and the second set of alarms.

One embodiment comprises a system for integrating help desk ticket tracking with root cause analysis comprising a network interface and a processor in communication with the network interface. The network interface receives data from a plurality of monitoring applications monitoring a networked computing environment. The processor detects an alert corresponding with a performance issue in a networked computing environment and aggregates data from a plurality of monitoring applications monitoring the networked computing environment. The processor generates a failure graph based on the aggregated data. The failure graph includes a plurality of nodes and a set of directed edges. Each directed edge of the set of directed edges corresponds with a causal relationship between a pair of the plurality of nodes. The alert corresponds with a root node of the failure graph. The processor identifies a first leaf node of the plurality of nodes. The first leaf node corresponds with a root cause of the performance issue. The processor determines a first remedy associated with the first leaf node and automatically generates a help desk ticket corresponding with the first leaf node and the first remedy in response to detecting the alert.

One embodiment comprises a computer program product comprising a computer readable storage medium having computer readable program code embodied therewith. The computer readable program code configured to detect an alert corresponding with a performance issue in a networked computing environment, to aggregate data from a plurality of monitoring applications monitoring the networked computing environment, and to generate a failure graph based on the aggregated data. The failure graph includes a plurality of nodes and a set of directed edges. Each directed edge of the set of directed edges corresponds with a causal relationship between a pair of the plurality of nodes. The alert corresponds with a root node of the failure graph. The computer readable program code configured to identify a first leaf node of the plurality of nodes. The first leaf node corresponds with a root cause of the performance issue. The computer readable program code configured to determine a first remedy associated with the first leaf node and to automatically generate a help desk ticket corresponding with the first leaf node and the first remedy in response to detecting the alert.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" may be used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for integrating help desk ticket tracking with root cause analysis, comprising:
    detecting an alert corresponding with a performance issue in a networked computing environment;
    aggregating data from a plurality of monitoring applications monitoring the networked computing environment;
    generating a failure graph based on the aggregated data, the failure graph comprises a plurality of nodes and a set of directed edges, each directed edge of the set of directed edges corresponds with a causal relationship between a pair of the plurality of nodes, the alert corresponds with a root node of the failure graph;
    detecting a second alert corresponding with a second performance issue within the networked computing environment, the alert corresponds with a first failure of a first application within the networked computing environment and the second alert corresponds with a second failure of a second application within the networked computing environment different from the first application;
    generating a second failure graph based on the aggregated data, the second alert corresponds with a root node of the second failure graph;
    identifying a common leaf node that is common to both the failure graph and the second failure graph, the common leaf node corresponds with a root cause of the performance issue;
    determining a first remedy associated with the common leaf node; and
    automatically generating a help desk ticket corresponding with the common leaf node and the first remedy in response to detecting the alert and the second alert.

2. The method of claim 1, further comprising:
    acquiring help desk ticket information associated with help desk tickets entered into a database covering performance issues affecting the networked computing environment; and
    processing the help desk ticket information to identify a second set of alarms, the aggregated data comprises a plurality of alarms generated from the plurality of monitoring applications, the generating a failure graph comprises generating the failure graph based on the plurality of alarms and the second set of alarms.

3. The method of claim 1, wherein:
    the networked computing environment comprises a plurality of servers within a data center and a cooling system for regulating an ambient temperature of a portion of the data center, the root cause of the performance issue comprises a failure of the cooling system.

4. The method of claim 1, wherein:
    the aggregated data comprises a plurality of alarms generated from the plurality of monitoring applications and log file data generated by devices within the networked computing environment.

5. The method of claim 1, wherein:
    the determining a first remedy comprises determining the first remedy based on a failure layer associated with the common leaf node.

6. The method of claim 5, wherein:
    the failure layer is associated with system-level failures.

7. The method of claim 1, wherein:
    the performance issue comprises a server failure.

8. The method of claim 1, wherein:
    the plurality of monitoring applications comprises an application-level monitor, a network-level monitor, and a system-level monitor.

9. The method of claim 1, wherein:
    the automatically generating a help desk ticket comprises submitting the help desk ticket to a database, the help desk ticket specifies a failure associated with the common leaf node, the first remedy, a location associated with the first remedy, and an estimated time to fix the failure.

10. A system for integrating help desk ticket tracking with root cause analysis, comprising:
    a network interface configured to receive data from a plurality of monitoring applications monitoring a networked computing environment; and
    a processor configured to detect an alert corresponding with a performance issue in a networked computing environment and aggregate data from a plurality of monitoring applications monitoring the networked computing environment, the processor configured to generate a failure graph based on the aggregated data, the failure graph comprises a plurality of nodes and a set of directed edges, each directed edge of the set of directed edges corresponds with a causal relationship between a pair of the plurality of nodes, the alert corresponds with a root node of the failure graph, the processor configured to detect a second alert corresponding with a second performance issue within the networked computing environment, the alert corresponds with a first failure of a first application within the networked computing environment and the second alert corresponds with a second failure of a second application within the networked computing environment different from the first application, the processor configured to generate a second failure graph based on the aggregated data, the second alert corresponds with a root node of the second failure graph, the processor configured to identify a common leaf node that is common to both the failure graph and the second failure graph, the common leaf node corresponds with a root cause of the performance issue, the processor configured to determine a first remedy associated with the common leaf node and automatically generate a help desk ticket corresponding with the common leaf node and the first remedy in response to detecting the alert.

11. The system of claim 10, wherein:
    the processor configured to determine the first remedy based on a failure layer associated with the common leaf node.

12. The system of claim 11, wherein:
    the failure layer is associated with system-level failures.

13. The system of claim 10, wherein:
    the performance issue comprises a server failure.

14. The system of claim 10, wherein:
    the plurality of monitoring applications comprises an application-level monitor, a network-level monitor, and a system-level monitor.

15. The system of claim 10, wherein:
    the processor configured to automatically generate the help desk ticket by submitting the help desk ticket to a database, the help desk ticket specifies a failure associated with the common leaf node, the first remedy, a location associated with the first remedy, and an estimated time to fix the failure.

16. A computer program product, comprising:
a non-transitory computer readable storage medium having computer readable program code embodied therewith, the computer readable program code comprising:
computer readable program code configured to detect an alert corresponding with a performance issue in a networked computing environment;
computer readable program code configured to aggregate data from a plurality of monitoring applications monitoring the networked computing environment;
computer readable program code configured to generate a failure graph based on the aggregated data, the failure graph comprises a plurality of nodes and a set of directed edges, each directed edge of the set of directed edges corresponds with a causal relationship between a pair of the plurality of nodes, the alert corresponds with a root node of the failure graph;
computer readable program code configured to detect a second alert corresponding with a second performance issue within the networked computing environment, the alert corresponds with a first failure of a first application within the networked computing environment and the second alert corresponds with a second failure of a second application within the networked computing environment different from the first application;
computer readable program code configured to generate a second failure graph based on the aggregated data, the second alert corresponds with a root node of the second failure graph;
computer readable program code configured to identify a common leaf node that is common to both the failure graph and the second failure graph, the common leaf node corresponds with a root cause of the performance issue;
computer readable program code configured to determine a first remedy associated with the common leaf node; and
computer readable program code configured to automatically generate a help desk ticket corresponding with the common leaf node and the first remedy in response to detecting the alert.

17. The computer program product of claim 16, further comprising:
computer readable program code configured to acquire help desk ticket information associated with help desk tickets entered into a database covering performance issues affecting the networked computing environment; and
computer readable program code configured to process the help desk ticket information to identify a second set of alarms, the aggregated data comprises a plurality of alarms generated from the plurality of monitoring applications, the generating a failure graph comprises generating the failure graph based on the plurality of alarms and the second set of alarms.

18. The computer program product of claim 17, wherein:
the computer readable program code configured to process the help desk ticket information causes the help desk ticket information to be parsed for keywords.

19. The computer program product of claim 16, wherein:
the computer readable program code configured to determine the first remedy based on a failure layer associated with the common leaf node.

20. The computer program product of claim 16, wherein:
the computer readable program code configured to automatically generate a help desk ticket submits the help desk ticket to a database, the help desk ticket specifies a failure associated with the common leaf node, the first remedy, a location associated with the first remedy, and an estimated time to fix the failure.

* * * * *